United States Patent
Thatte et al.

(10) Patent No.: US 10,731,702 B2
(45) Date of Patent: Aug. 4, 2020

(54) SYSTEM AND METHOD FOR HYBRID HYDRODYNAMIC-HYDROSTATIC THRUST BEARINGS

(71) Applicants: Azam Mihir Thatte, Kensington, CA (US); Behzad Zamanian Yazdi, San Francisco, CA (US)

(72) Inventors: Azam Mihir Thatte, Kensington, CA (US); Behzad Zamanian Yazdi, San Francisco, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 4 days.

(21) Appl. No.: 16/180,264

(22) Filed: Nov. 5, 2018

(65) Prior Publication Data

US 2020/0141444 A1 May 7, 2020

(51) Int. Cl.
*F16C 17/04* (2006.01)
*F04F 13/00* (2009.01)

(52) U.S. Cl.
CPC ............ *F16C 17/045* (2013.01); *F04F 13/00* (2013.01)

(58) Field of Classification Search
CPC .... F16C 17/045; F16C 32/0692; F16C 17/04; F04F 13/00
USPC ........................................................ 384/123
See application file for complete search history.

(56) References Cited

U.S. PATENT DOCUMENTS

| | | | | |
|---|---|---|---|---|
| 3,376,083 A | * | 4/1968 | Muijderman | F16C 33/102 384/123 |
| 5,988,993 A | * | 11/1999 | Hauge | F04F 13/00 417/365 |
| 2003/0039415 A1 | * | 2/2003 | Huang | F16C 17/026 384/100 |
| 2012/0257991 A1 | | 10/2012 | Woodthorpe | |
| 2015/0003760 A1 | * | 1/2015 | Van Mullem | F16C 32/0651 384/123 |
| 2016/0013864 A1 | | 5/2016 | Anderson | |
| 2016/0138649 A1 | * | 5/2016 | Anderson | E21B 43/16 384/107 |

FOREIGN PATENT DOCUMENTS

| | | |
|---|---|---|
| CN | 1632331 A | 6/2005 |
| CN | 10277562 B | 1/2015 |
| CN | 204213175 U | 3/2015 |
| CN | 103438097 B | 2/2016 |

OTHER PUBLICATIONS

International Search Report; Written Opinion; PCT/US2019/058468; dated Jan. 22, 2020; 6 pages.

\* cited by examiner

*Primary Examiner* — Philip E Stimpert
(74) *Attorney, Agent, or Firm* — Fletcher Yoder, P.C.

(57) ABSTRACT

A system includes a hydraulic energy transfer system configured to exchange pressures between a first fluid and a second fluid, wherein the first fluid has a pressure higher than the second fluid. The hydraulic transfer system includes a cylindrical rotor configured to rotate circumferentially about a rotational axis and having a first end face and a second end face disposed opposite each other, a first end cover having a first surface that interfaces with the first end face of the cylindrical rotor, and a hybrid hydrodynamic-hydrostatic bearing system configured to resist axial displacement of the cylindrical rotor.

18 Claims, 15 Drawing Sheets

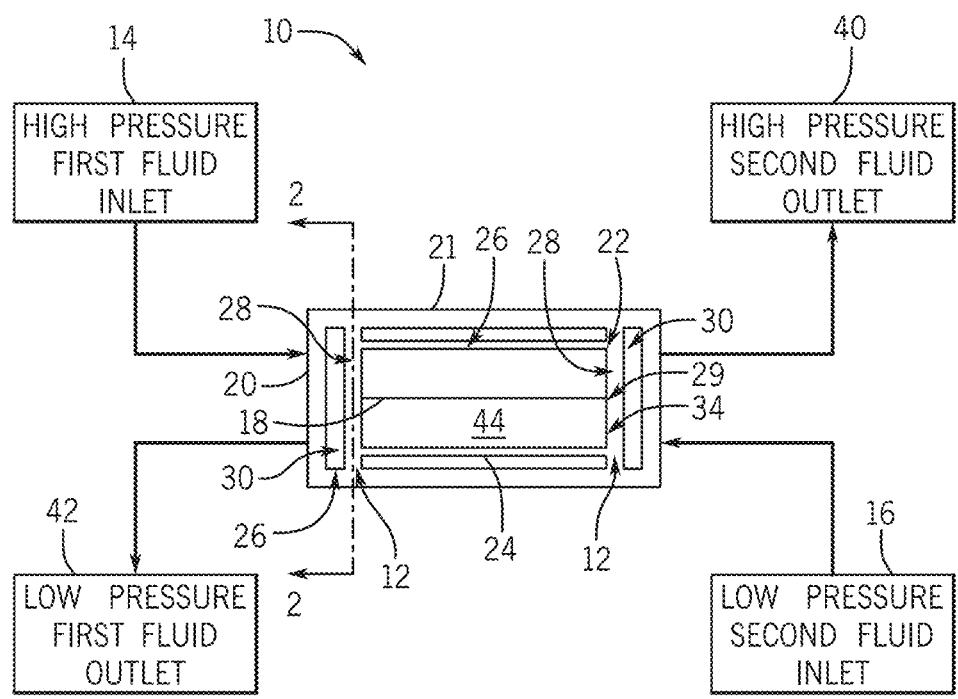
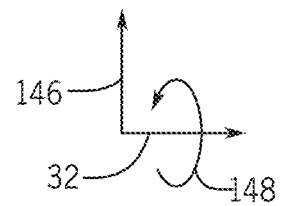
FIG. 1

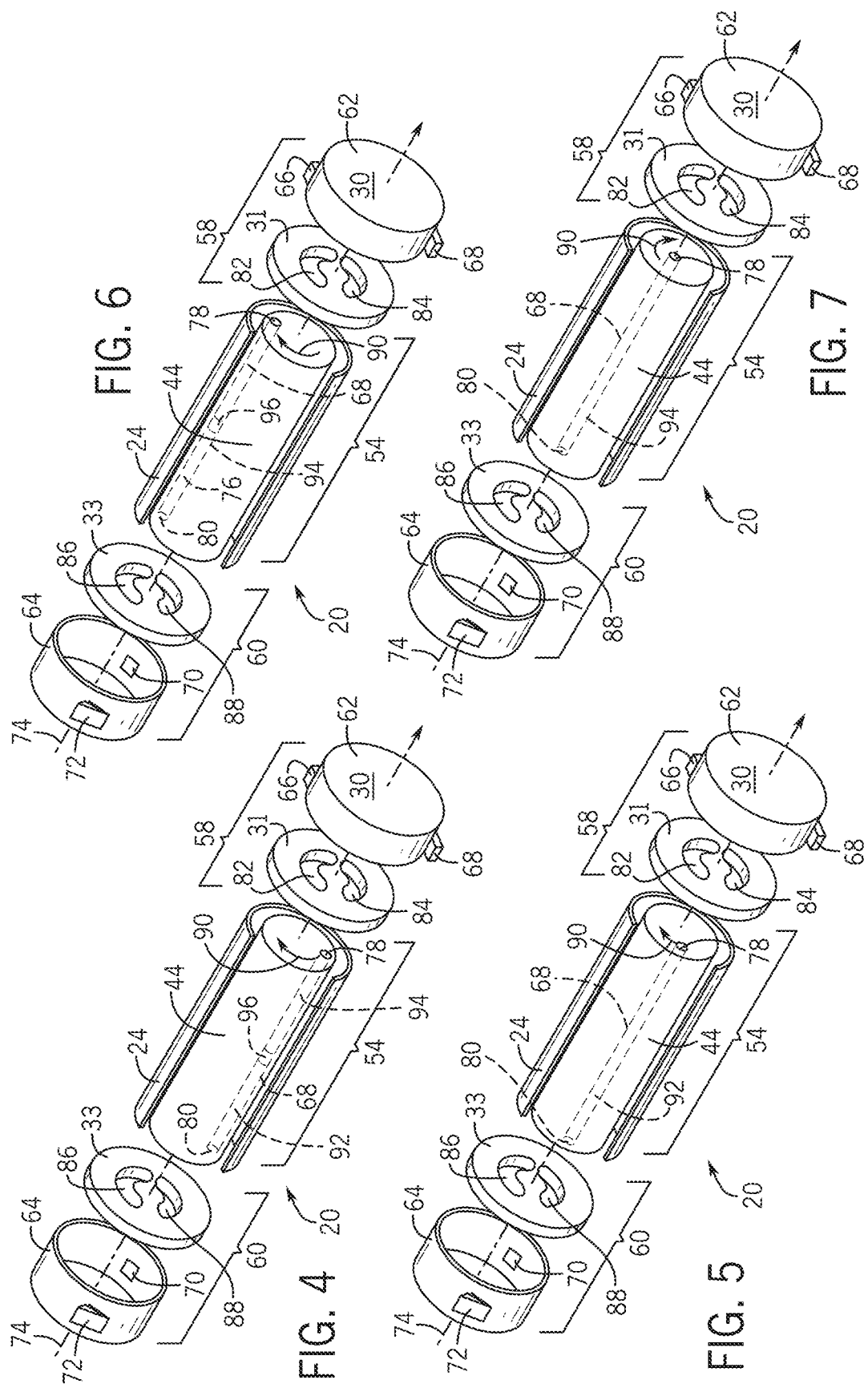

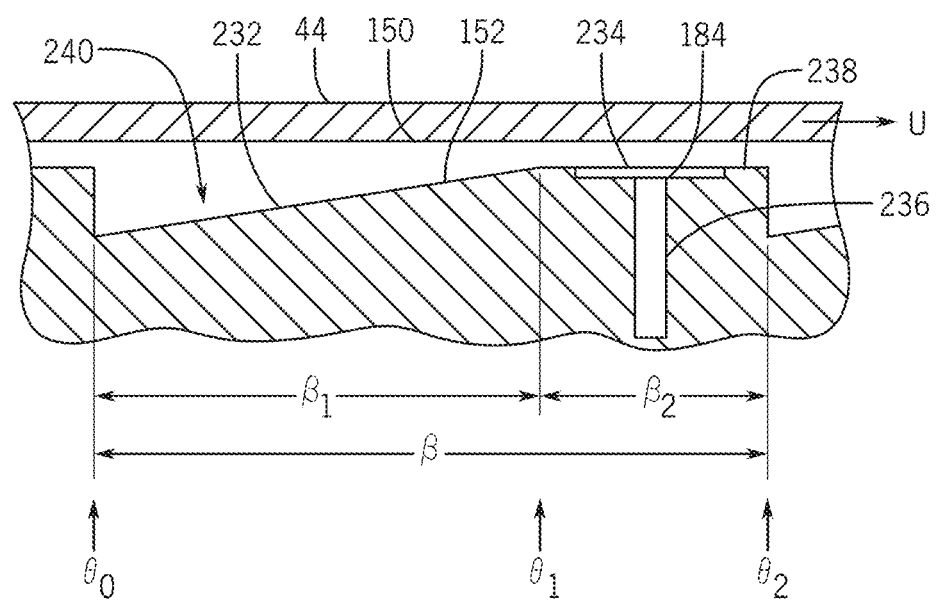
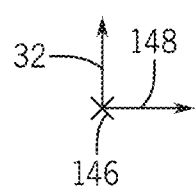
FIG. 28

SYSTEM AND METHOD FOR HYBRID HYDRODYNAMIC-HYDROSTATIC THRUST BEARINGS

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to systems and methods for an axial thrust bearing system including hybrid hydrodynamic-hydrostatic design features) for use with rotatory pressure exchanger described here as well for pumps, turbines and other rotary machines.

Rotating equipment, such as pumps, may handle a variety of fluids. In certain applications, axial pressure imbalances (i.e. the difference in average pressure between the two axial faces) may exert a substantial net force on rotating components of the rotating equipment. Axial forces may also arise due to the weight of the rotating components. Various bearings may be used to facilitate the rotation of the rotating components of the equipment. However, in situations that require a high pressure and/or a challenging environment, rotating equipment may require additional or increased bearing capacity and functionality. For example, in some situations, rotating equipment with insufficient bearing capacity may result in axial contact between rotating components and stationary components resulting in stalling, wear, stress, and may reduce the life of the equipment and result in a loss of efficiency. Accordingly, it may be beneficial to provide rotating equipment with features that provide additional I load bearing capacity or additional stiffness.

BRIEF DESCRIPTION

In one embodiment, a system is provided. The system includes a hydraulic energy transfer system configured to exchange pressures between a first fluid and a second fluid, wherein the first fluid has a pressure higher than the second fluid. The hydraulic transfer system includes a cylindrical rotor configured to rotate circumferentially about a rotational axis and having a first end face and a second end face disposed opposite each other, a first end cover having a first surface that interfaces with the first end face of the cylindrical rotor, and a hybrid hydrodynamic-hydrostatic bearing system configured to resist axial displacement of the cylindrical rotor.

In another embodiment, a system is provided. The system includes a hydraulic energy transfer system configured to exchange pressures between a first fluid and a second fluid, wherein the first fluid has a pressure higher than the second fluid. The hydraulic transfer system includes a cylindrical rotor configured to rotate circumferentially about a rotational axis and having a first end face and a second end face disposed opposite each other, a first end cover having a first surface that interfaces with the first end face of the cylindrical rotor, and a hybrid hydrodynamic-hydrostatic bearing system configured to resist axial displacement of the cylindrical rotor. The hybrid hydrodynamic-hydrostatic bearing system includes hydrodynamic pressure generation features disposed on the first end face of the cylindrical rotor and hydrostatic pressure enhancement features disposed on the first surface of the first end cover. The hydrodynamic pressure generation features include one or more grooves disposed on the first. The hydrostatic pressure enhancement features include multiple ports.

In a further embodiment, a system is provided. The system includes a hydraulic energy transfer system configured to exchange pressures between a first fluid and a second fluid, wherein the first fluid has a pressure higher than the second fluid. The hydraulic transfer system includes a cylindrical rotor configured to rotate circumferentially about a rotational axis and having a first end face and a second end face disposed opposite each other, a first end cover having a first surface that interfaces with the first end face of the cylindrical rotor, and a hybrid hydrodynamic-hydrostatic bearing system configured to resist axial displacement of the cylindrical rotor. The hybrid hydrodynamic-hydrostatic bearing system includes both hydrodynamic pressure generation features disposed on the first surface of the first end cover and hydrostatic pressure enhancement features disposed on the first surface of the first end cover.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a schematic diagram of an embodiment of a hydraulic energy transfer system having a hybrid hydrodynamic-hydrostatic bearing system;

FIG. 4 is an exploded perspective view of an embodiment of a rotary PX in a first operating position;

FIG. 5 is an exploded perspective view of an embodiment of a rotary PX in a second operating position;

FIG. 6 is an exploded perspective view of an embodiment of a rotary PX in a third operating position;

FIG. 7 is an exploded perspective view of an embodiment of a rotary PX in a fourth operating position;

FIG. 28 is a cross-sectional view of the end cover taking along line 28-28 of FIG. 26.

DETAILED DESCRIPTION OF SPECIFIC EMBODIMENTS

Figure 2:
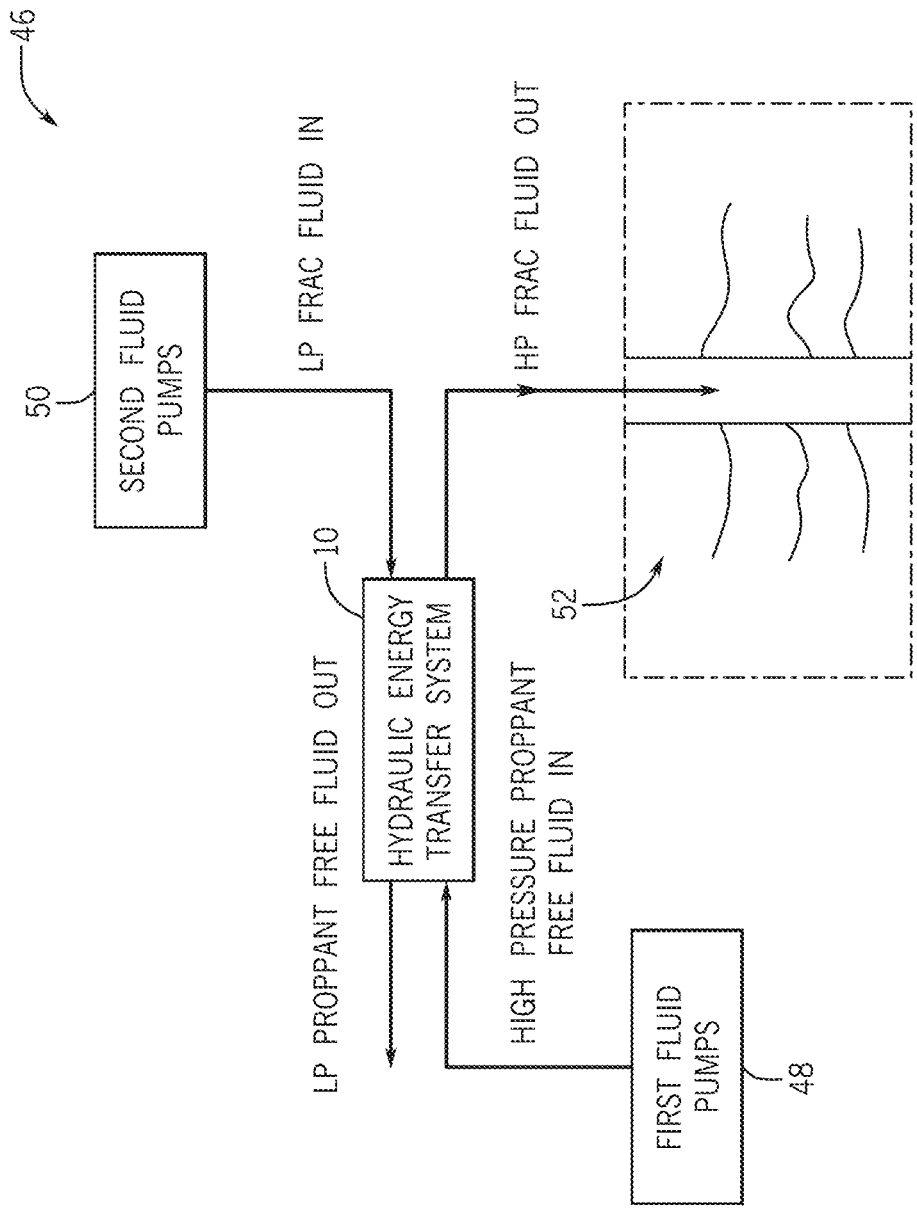
FIG. 2 is a schematic diagram of an embodiment of a frac system with a hydraulic energy transfer system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, the embodiments disclosed herein generally relate to systems and methods for rotating systems that may be utilized in various industrial applications. The rotating systems disclosed herein may include a hybrid hydrodynamic-hydrostatic bearing system configured to provide an additional bearing capacity, so that the rotating system provides sufficient load capacity for supporting certain rotating equipment, such as the rotor. Indeed, in certain industrial situations involving high pressures or other challenging applications, the bearing system of the rotating system may have insufficient load capacities or functionalities to support rotating equipment, such as the rotor. Such situations may result in a stalled rotor and/or contact/friction between portions of the bearing system, thereby resulting in a loss of efficiency, wear, stress, and/or a reduced life of the rotating equipment. Accordingly, the embodiments disclosed herein may provide rotating system having a hybrid hydrodynamic-hydrostatic bearing system in an axial bearing region (e.g., the interface between a rotor and an end cover of a hydraulic energy transfer system) configured to handle additional bearing or load capacities, which may, for example, provide additional axial load capacities and a greater stiffness for supporting rotating equipment, such as the rotor. Particularly, the hybrid hydrodynamic-hydrostatic bearing system may be utilized within industrial applications having higher pressures (e.g., approximately 68,947 kPa or 10,000 psi) and/or more challenging applications, such as, for example, in pressure exchangers, axial piston pumps, steam turbine thrust bearings, gas turbine thrust bearings and in aircraft engines. In certain embodiments, the hybrid hydrodynamic-hydrostatic bearing system may be utilized in non-rotating equipment.

In certain embodiments, the rotating system may include a hydraulic energy transfer system that is configured to handle a variety of fluids. Specifically, the hydraulic energy transfer system may transfer work and/or pressure between first and second fluids via a hybrid hydrodynamic-hydrostatic bearing system that may be used to facilitate the rotation of rotating components of the equipment. Generally, hydrostatic bearing systems within the hydraulic energy transfer system may operate with a source of fluid (e.g., high pressure bearing fluid) that is introduced between a rotor and end covers (e.g., support for the rotor). The high pressure of the fluid source may be configured to support the rotor on a fluid film and may be configured to facilitate the rotation of the rotating components. Particularly, when the rotor moves away from the end covers, an axial clearance region between the rotor and the end cover may increase. The increase in the axial clearance region allows the high pressure fluid to escape, thereby decreasing the pressure acting on the rotor. Likewise, when the axial clearance region is small between the rotor and the end cover, high pressure fluid builds within the axial bearing region. The hydrodynamic bearing systems relying on the high speed of the rotor (in conjunction with features that form pressure dams) similarly supports the rotor on a fluid film and facilitates the rotation of the rotating components (e.g., acting on the end covers and the rotor).

The hybrid hydrodynamic-hydrostatic bearing enhances the properties of both the hydrostatic and hydrodynamic bearing systems. For example, at higher speeds (e.g., 10,000 rpm) the hybrid hydrodynamic-hydrostatic bearing performs as a superior hydrodynamic bearing, while at low and medium speeds (e.g. 5,000 rpm or less) the hybrid bearing performs as a better hydrostatic bearing. At all speeds of operation, the hybrid bearing enhances load bearing capacity and stiffness, while also improving dynamic stability (e.g., compared to a pure hydrodynamic bearing system) and improved cooling capacity or viscous heat removal. The hybrid bearing also provides bearing film pressure modulation capacity and self-correcting behavior to adjust dynamic motions (e.g., of components such as the rotor and housing). Further, the hybrid bearing provides reliable operation (e.g., the hydrodynamic bearing system working even if the hydrostatic bearing system seizes due to blockages or gap closure). Even further, the hybrid bearing works without external moving parts and is not limited by fatigue. Yet further, the hybrid bearing is more tolerant to particulates (e.g., sand) in the fluid. Still further, the hybrid bearing is easy to machine and manufacture.

In certain embodiments, the hybrid hydrodynamic-hydrostatic bearing system may include hydrodynamic pressure generation features disposed on a rotor end face along with hydrostatic pressure enhancement features disposed on the end covers (e.g., of the rotating isobaric pressure exchanger). In other embodiments, the hybrid bearing system may include both the hydrodynamic and hydrostatic features disposed solely on the end covers with no features on the rotor end face. The hydrodynamic pressure generation features may include spiral-shaped grooves, herringbone shaped grooves, tapered lands, along with other features. The hydrostatic features may include ports, ports in conjunctions with pockets, ports in conjunction with both orifice flow restrictors and pockets, along with other features.

The hydraulic energy transfer system may include a hydraulic turbocharger, hydraulic pump or a hydraulic pressure exchange system, such as a rotating pressure exchanger (PX). In some embodiments, the pressures of the volumes of first and second fluids may not completely equalize. Thus, in certain embodiments, the PX may operate isobarically, or the PX may operate substantially isobarically (e.g., wherein the pressures equalize within approximately +/−1, 2, 3, 4, 5, 6, 7, 8, 9, or 10 percent of each other). In certain embodiments, a first pressure of a first fluid (e.g., pressure exchange fluid, motive fluid, etc.) may be greater than a second pressure of a second fluid (e.g., corrosive fluid). For example, the first pressure may be between approximately 5,000 kPa to 25,000 kPa, 20,000 kPa to 50,000 kPa, 40,000 kPa to 75,000 kPa, 75,000 kPa to 100,000 kPa or greater than the second pressure. Thus, the PX may be used to transfer pressure from a first fluid (e.g., pressure exchange fluid, motive fluid, etc.) at a higher pressure to a second fluid (e.g., corrosive fluid) at a lower pressure. In particular, during operation, the hydraulic energy transfer system may help block or limit contact between the corrosive fluid and other equipment within the industrial applications (e.g., pumps). By blocking or limiting contact between pumps and the corrosive fluids, the hydraulic energy transfer system increases the life/performance while reducing abrasion/wear of various high pressure pumps within various industrial applications as described in detail below.

FIG. 1 is a schematic diagram of an embodiment of a hydraulic energy transfer system 10. In particular, in the illustrated embodiment, the hydraulic energy transfer system 10 (e.g., a hydraulic turbocharger or PX) may be configured to transfer energy from a first fluid to a second fluid. Furthermore, in certain embodiments, the hydraulic energy transfer system 10 may include a hybrid hydrodynamic-hydrostatic bearing system 12 configured with features that help provide the hydraulic energy transfer system 10 with additional bearing capacities and/or additional axial load capacities.

In certain embodiments, the hydraulic energy transfer system 10 may be configured with a rotary PX 20 configured to receive a first fluid and a second fluid. It should be noted that reference to various directions (e.g., axial direction 32, radial direction 142, and circumferential direction 148) may be referred to in the following discussion. In certain embodiments, a high pressure pump may be configured to pump the first fluid to the hydraulic energy transfer system 10 at a high pressure. For example, as illustrated, the first fluid may be provided as a high pressure first fluid inlet 14 to the hydraulic energy transfer system 10. Further, in certain embodiments, a low pressure pump may be configured to pump the second fluid to the hydraulic energy transfer system 10 at a low pressure. For example, as illustrated, the second fluid may be provided as a low pressure second fluid inlet 16 to the hydraulic energy transfer system 10. During operation, the hydraulic energy transfer system 10 may be configured to transfer pressures between the first fluid and the second fluid.

As used herein, the pressure exchanger (PX) 20 may be generally defined as a device that transfers fluid pressure between a high pressure inlet stream and a low pressure inlet stream at efficiencies in excess of approximately 90% without utilizing centrifugal technology. In this context, high pressure refers to pressures greater than the low pressure. The low pressure inlet stream of the PX 20 may be pressurized and exit the PX at high pressure (e.g., at a pressure greater than that of the low pressure inlet stream), and the high pressure inlet stream may be depressurized and exit the PX 20 at low pressure (e.g., at a pressure less than that of the high pressure inlet stream). Additionally, the PX 20 may operate with the high pressure fluid directly applying a force to pressurize the low pressure fluid, with or without a fluid separator between the fluids. Examples of fluid separators that may be used with the PX include, but are not limited to, pistons, bladders, diaphragms and the like. In certain embodiments, pressure exchangers 20 may be rotary devices. Rotary pressure exchangers (PXs) 20, such as those manufactured by Energy Recovery, Inc. of San Leandro, Calif., may not have any separate valves, since the effective valving action is accomplished internal to the device via the relative motion of a rotor with respect to end covers, as described in detail below with respect to FIGS. 4-7. Rotary PXs 20 may be designed to operate with internal pistons to isolate fluids and transfer pressure with relatively little mixing of the inlet fluid streams. Reciprocating PXs may include a piston moving back and forth in a cylinder for transferring pressure between the fluid streams. Any PX or plurality of PXs 20 may be used in the disclosed embodiments, such as, but not limited to, rotary PXs, reciprocating PXs, or any combination thereof. In addition, the PX 20 may be disposed on a skid separate from the other components of a fluid handling system, which may be desirable in situations in which the PX 20 is added to an existing fluid handling system.

As noted above, in certain embodiments, the hydraulic energy transfer system 10 may include the hybrid hydrodynamic-hydrostatic bearing system 12 configured to help facilitate the rotation of the rotating components within the system, such as the rotor 44. Generally, high pressure process fluids (e.g., first fluid and/or second fluid) may act as the bearing fluid and be utilized for axial load bearing. The rotor 44 of the PX 20 is enclosed within a plenum region 22 of a housing 21. The rotor 44 is disposed with a sleeve 24. An inner wall of a sleeve 24 of the PX system 20 and an outer wall of the rotor 44 disposed within the PX system 20 define a radial gap 26 between the sleeve 24 and the rotor 44.

An axial bearing region 28, includes axial gaps 29 (e.g., few tens of microns) between the rotor 44 and the end covers 30. The high pressure bearing fluid introduced into the plenum region 22 may be configured to support the rotor 44 on a fluid film and may be configured to facilitate the rotation of the rotor 44. Particularly, when the rotor 44 moves axially 32 towards the end cover 30 due to external forces caused by the fluid pressure differentials acting on the rotor 44, an axial clearance region 34 between the rotor 44 and the end cover 30 may decrease. The decrease in the axial clearance region 34 causes the pressure in the bearing fluid film to increase (pressure in the bearing film has an approximately inverse cubic relationship with the bearing film thickness) thereby increasing the force acting on the rotor 44 in a direction opposite to the original external force that caused the rotor 44 to move and reduce the bearing gap 29. This new bearing force in turn increases the axial clearance region 34 to a greater amount and brings the rotor 44 to a new force equilibrium position. Hence, in effect, this is a "self-correcting" mechanism that keeps the rotor 44 from rubbing against the end cover 30 and possibly causing the system to stall. Likewise, when the rotor 44 is forced by external forces to move axially 32 away from the bearing, the axial clearance region 34 between the rotor 44 and the end cover 30 increases, causing the pressure in the bearing fluid film to reduce. This results in the reduction of the force acting on the rotor 44 from the bearing film which brings the rotor 44 back to its equilibrium position to avoid rubbing on the other side of the rotor 44. In this manner, components of the hybrid hydrodynamic-hydrostatic bearing may work in tandem to create a stiff bearing system that resists axial displacement of the rotor 44 and facilities the steady rotation of the rotor 44.

FIG. 2 is a schematic diagram of an embodiment of a frac system 46 (e.g., fluid handling system) that may be used with the hydraulic energy transfer system 10. In operation, the frac system 46 enables well completion operations to increase the release of oil and gas in rock formations. The frac system 46 may include one or more first fluid pumps 48 and one or more second fluid pumps 50 coupled to a hydraulic energy transfer system 10. As described above, the hydraulic energy system 10 may include a hydraulic turbocharger, rotary PX, reciprocating PX, or any combination thereof. In addition, the hydraulic energy transfer system 10 may be disposed on a skid separate from the other components of a frac system 46, which may be desirable in situations in which the hydraulic energy transfer system 10 is added to an existing frac system 46. In operation, the hydraulic energy transfer system 10 transfers pressures without any substantial mixing between a first fluid (e.g., proppant free fluid) pumped by the first fluid pumps 48 and a second fluid (e.g., proppant containing fluid or frac fluid) pumped by the second fluid pumps 50. In this manner, the hydraulic energy transfer system 10 blocks or limits wear on the first fluid pumps 48 (e.g., high-pressure pumps), while enabling the frac system 46 to pump a high-pressure frac fluid into the well 52 to release oil and gas. In addition, because the hydraulic energy transfer system 10 is configured to be exposed to the first and second fluids, the hydraulic energy transfer system 10 may be made from materials resistant to corrosive and abrasive substances in either the first and second fluids. For example, the hydraulic energy transfer system 10 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

Although the use of the hydraulic energy transfer system 10 (e.g., PX) with the hybrid hydrodynamic-hydrostatic bearing system 12 is discussed in the context of the frac system 46, the hydraulic energy transfer system 46 may be utilized in other types of applications (e.g., desalination, mud-pumping, etc.). In addition, the hybrid hydrodynamic-hydrostatic bearing system 12 may be utilized with liquid and gas handling turbomachinery, steam turbines, gas turbines, aircraft engine, carbon dioxide compressors, among other types of equipment.

Figure 3:
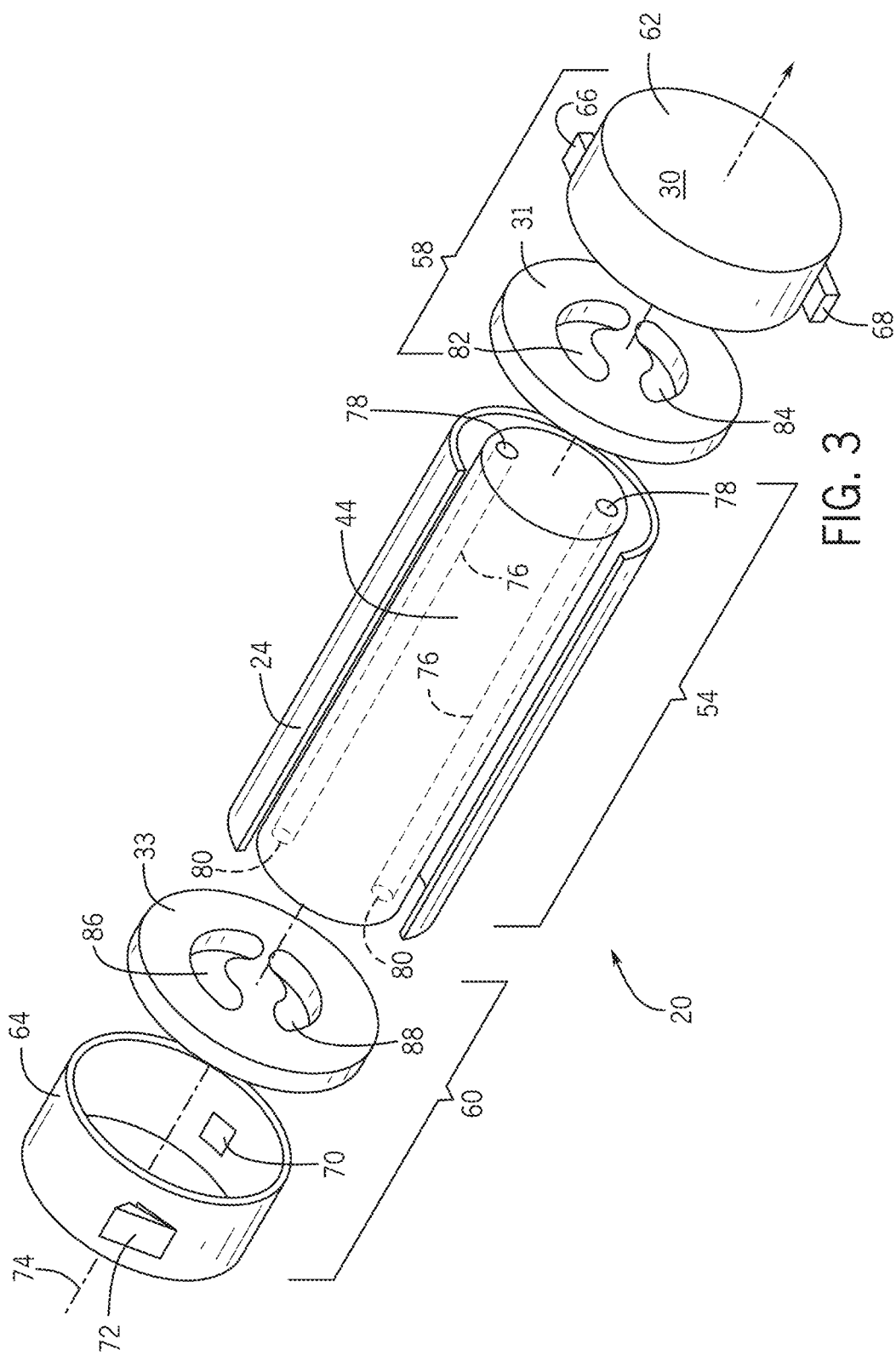
FIG. 3 is an exploded perspective view of an embodiment of the hydraulic energy transfer system of FIG. 1, illustrated as a rotary pressure exchanger (PX) system.

Returning now to the hydraulic energy transfer system 10 of FIG. 1, the PX system 20 may be further understood in the discussion with respect to FIGS. 3-7. FIG. 3 is an exploded view of an embodiment of the rotary PX 20. In the illustrated embodiment, the rotary PX 20 may include a generally cylindrical body portion 54 that includes a housing 56 and the rotor 44. The rotary PX 20 may also include two end structures 58 and 60 that include manifolds 62 and 64, respectively. Manifold 62 includes inlet and outlet ports 66 and 68 and manifold 64 includes inlet and outlet ports 70 and 72. For example, inlet port 66 may receive a high pressure first fluid and the outlet port 68 may be used to route a low pressure first fluid away from the PX 20. Similarly, inlet port 70 may receive a low pressure second fluid and the outlet port 72 may be used to route a high pressure second fluid away from the PX 20. The end structures 58 and 60 include generally flat end plates 31, 33 (e.g., end covers 30), respectively, disposed within the manifolds 62 and 64, respectively, and adapted for fluid sealing contact with the rotor 44. The rotor 44 may be cylindrical and disposed in the housing 56, and is arranged for rotation about a longitudinal axis 74 of the rotor 44. The rotor 44 may have a plurality of channels 76 extending substantially longitudinally through the rotor 44 with openings 78 and 80 at each end arranged symmetrically about the longitudinal axis 74. The openings 78 and 80 of the rotor 44 are arranged for hydraulic communication with the end plates 62 and 64, and inlet and outlet apertures 82 and 84, and 86 and 88, in such a manner that during rotation they alternately hydraulically expose fluid at high pressure and fluid at low pressure to the respective manifolds 62 and 64. The inlet and outlet ports 66, 68, 70, and 72, of the manifolds 62 and 64 form at least one pair of ports for high pressure fluid in one end element 58 or 60, and at least one pair of ports for low pressure fluid in the opposite end element, 58 or 60. The end plates 62 and 64, and inlet and outlet apertures 82 and 84, and 86 and 88 are designed with perpendicular flow cross sections in the form of arcs or segments of a circle.

With respect to the PX 20, the plant operator has control over the extent of mixing between the first and second fluids, which may be used to improve the operability of the fluid handling system. For example, varying the proportions of the first and second fluids entering the PX 20 allows the plant operator to control the amount of fluid mixing within the fluid handling system. In certain embodiments, the proportion of the motive fluid may be varied with respect to the corrosive fluid to control the amount of mixing within the fluid handling system. In other embodiments, plant operator may control the angular speed of rotation of the rotor 44 to control the amount of mixing. Three characteristics of the PX 20 that affect mixing are: (1) the aspect ratio of the rotor channels 76, (2) the short duration of exposure between the first and second fluids, and (3) the creation or presence of a fluid barrier (e.g., an interface) between the first and second fluids within the rotor channels 76. First, the rotor channels 76 are generally long and narrow, which stabilizes the flow within the PX 20. In addition, the first and second fluids may move through the channels 76 in a plug flow regime with very little axial mixing. Second, in certain embodiments, at a rotor speed of approximately 1200 RPM, the time of contact between the first and second fluids may be less than approximately 0.15 seconds, 0.10 seconds, or 0.05 seconds, which again limits mixing of the streams. Third, a small portion of the rotor channel 76 is used for the exchange of pressure between the first and second fluids. Therefore, a volume of fluid remains in the channel 76 as a barrier between the first and second fluids. All these mechanisms may limit mixing within the PX 20.

FIGS. 4-7 are exploded views of an embodiment of the rotary PX 20 illustrating the sequence of positions of a single channel 76 in the rotor 44 as the channel 76 rotates through a complete cycle, and are useful to an understanding of the rotary PX 20. It is noted that FIGS. 4-7 are simplifications of the rotary PX 20 showing one channel 76 and the channel 76 is shown as having a circular cross-sectional shape. In other embodiments, the rotary PX 20 may include a plurality of channels 76 (e.g., 2 to 100) with different cross-sectional shapes. Thus, FIGS. 4-7 are simplifications for purposes of illustration, and other embodiments of the rotary PX 20 may have configurations different from that shown in FIGS. 5-8. As described in detail below, the rotary PX 20 facilitates a hydraulic exchange of pressure between two liquids by putting them in momentary contact within a rotating chamber. In certain embodiments, this exchange happens at a high speed that results in very high efficiency with very little mixing of the liquids.

In FIG. 4, the channel opening 78 is in hydraulic communication with aperture 84 in endplate 31 and therefore with the manifold 62 at a first rotational position of the rotor 44 and opposite channel opening 80 is in hydraulic communication with the aperture 88 in endplate 33, and thus, in hydraulic communication with manifold 64. As discussed below, the rotor 44 rotates in the clockwise direction indicated by arrow 90. As shown in FIG. 4, low pressure second fluid 92 passes through end plate 31 and enters the channel 76, where it pushes first fluid 94 out of the channel 76 and through end plate 31, thus exiting the rotary PX 20. In certain embodiments, the first and second fluids 92 and 94 contact one another at an interface 96 where minimal mixing of the liquids occurs because of the short duration of contact. In certain embodiments, the interface 96 may be a direct contact interface because the second fluid 92 directly contacts the first fluid 94. In other embodiments, the interface 96 may include a dynamic barrier that is utilized to separate the first fluid and the second fluid. In other embodiments, asymmetrical flow of the first and second fluids may result in a certain amount of mixing between the first and second fluids.

In FIG. 5, the channel 76 has rotated clockwise through an arc of approximately 90 degrees, and the outlet 80 is now blocked off between apertures 86 and 88 of end plate 33, and outlet 78 of the channel 76 is located between the apertures 82 and 84 of end plate 31 and, thus, blocked off from hydraulic communication with the manifold 62 of end structure 58. Thus, the low pressure second fluid 92 is contained within the channel 76.

In FIG. 6, the channel 76 has rotated through approximately 180 degrees of arc from the position shown in FIG. 4. Opening 80 is in hydraulic communication with aperture 86 in end plate 33 and in hydraulic communication with manifold 64, and the opening 78 of the channel 76 is in hydraulic communication with aperture 82 of end plate 31 and with manifold 62 of end structure 58. The liquid in channel 76, which was at the pressure of manifold 64 of end structure 60, transfers this pressure to end structure 58 through outlet 78 and aperture 82, and comes to the pressure of manifold 62 of end structure 58. Thus, high pressure first fluid 94 pressurizes and displaces the second fluid 92.

In FIG. 7, the channel 76 has rotated through approximately 270 degrees of arc from the position shown in FIG. 4, and the openings 70 and 72 of channel 68 are between apertures 82 and 84 of end plate 31, and between apertures 86 and 88 of end plate 33. Thus, the high pressure first fluid 94 is contained within the channel 76. When the channel 76 rotates through approximately 360 degrees of arc from the position shown in FIG. 4, the second fluid 92 displaces the first fluid 94, restarting the cycle.

The rotary PX system 20 and the hybrid hydrodynamic-hydrostatic bearing system 12 may be further understood with respect to the discussion of FIGS. 8-21. In certain embodiments, both end faces 150 of the rotor 40 may include the hydrodynamic pressure generation features 152, while one or both of the end covers 30 include hydrostatic features 184 to form the hybrid hydrodynamic-hydrostatic bearing system. In other embodiments, only one or both of the end covers 30 includes both hydrodynamic pressure generation features 152 and hydrostatic features 184 to form the hybrid hydrodynamic-hydrostatic bearing system.

Figure 8:
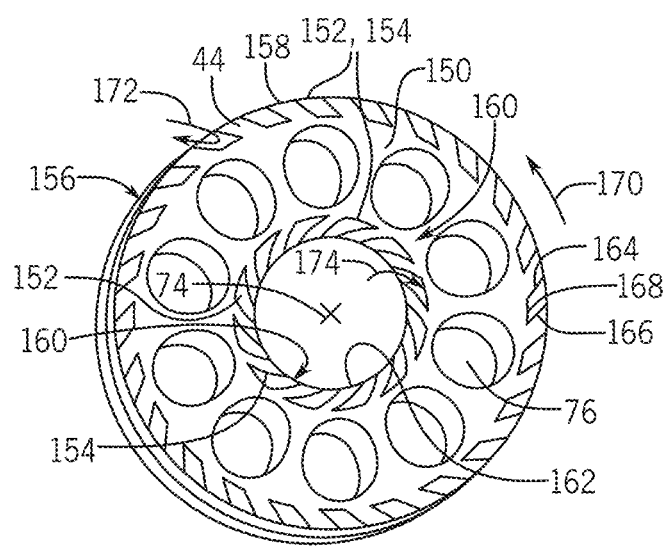
FIG. 8 is a side perspective view of an embodiment of an end face of a rotor of a rotary PX having hydrodynamic pressure generation features (e.g., spiral grooves)

FIG. 8 is a side perspective view of an embodiment of an end face 150 of the rotor 44 of the PX 20 having hydrodynamic pressure generation features 152 (e.g., spiral grooves). As depicted, the features 152 are grooves 154 (e.g., spiral grooves). A first set 156 of grooves 154 (e.g., inward pumping grooves) are disposed circumferentially 148 about the longitudinal axis 74 along an outer periphery or diameter 158 of the end face 150 (e.g., radially outside of the channels 76). A second set 160 of grooves 154 (e.g., outward pumping grooves) are disposed circumferentially 148 about the longitudinal axis 74 along an inner diameter 162 of the end face 150 (e.g., radially inside of the channels 76). The number of grooves 154 and shape of the grooves 154 may vary.

The spiral grooves 154 includes a shallow portion 164, a deep portion 166 (i.e., longer than the shallow portion 164), and a dam portion 168 disposed between the portions 164, 166. The spiral grooves 154 generate hydrodynamic pressure by converting momentum gain of the fluid along the spiral into dynamic pressure rise as that fluid impinges at the dam portion 168. For example, as the rotor 44 rotates as indicated by arrow 170, fluid accelerates along respective grooves 154 of the first and second sets 156, 160 (as indicated by arrows 172, 174, respectively) until the fluid impinges at the dam portion 168 (e.g., generating a pumping action). At the dam portion 168 kinetic energy is converted to pressure resulting in a high pressure spike such that when this pressure is integrated over the area of the groove, it generates a force that axially 32 pushes the rotor 44 away from the end cover 30. The groove design features (e.g. spiral angle of the grooves, dam to land ratio, pitch of the grooves, depth of the grooves etc.) can be optimized to fine tune the magnitude of this pressure spike and hence the magnitude of the resisting force generated by the grooves. The direction of the spiral angle of the inward pumping grooves (156) is opposite to that of the outward pumping grooves (160). This ensures that the fluid is swirled by the grooves towards ID (in case of 156) and towards OD (in case of 160) to provide high kinetic energy to the bearing fluid just before it impinges the respective dam sections radially inward (in case of 156) and radially outward (in case of 160). The presence of both sets 156, 160 of grooves 154 ensures the rotor 44 is supported across entire end face 150 and reduces the possibility of rubs with the end cover 30 due to transient tilts or ND2 vibrations (bending modes of the rotor face) in the rotor 44.

The Reynolds equation governs the thin film flow physics. The Reynolds equation is:

$$\frac{\partial}{\partial r}\left(\frac{r\rho h^3}{\mu}\frac{\partial p}{\partial r}\right) + \frac{1}{r}\frac{\partial}{\partial \theta}\left(\frac{\rho h^3}{\mu}\frac{\partial p}{\partial \theta}\right) = 6(U_1 - U_2)\frac{\partial(\rho h)}{\partial \theta} + 12r\rho\frac{\partial h}{\partial t} \quad (1)$$

where p is fluid film pressure, r and θ are the radial and circumferential coordinates in the bearing domain, h is fluid film thickness, p is fluid velocity, p is fluid density, $U_1$ and $U_2$ are the velocities of the bounding faces (circumferential velocity of the face times the radius), respectively, and 1, 2 are subscripts denoting the rotor and the stator faces. By solving this equation it can be seen that the hydrodynamic pressure rise is an inverse cubic function of the fluid film thickness and increases with rotor speed. The load carrying capacity and bearing stiffness are governed by groove depth, the number of grooves, and spiral angle of the grooves, dam radius, and land to width ratio. In certain embodiments, the depth of the grooves 154 (e.g., in axial direction 32) may be approximately a few tens of microns. The grooves 154 may be manufactured on the rotor end face 150 (e.g., using electrical discharge machining). The gap between the outermost surfaces of the end face 150 and the end cover 30 facing each other may be approximately 10-20 μm (where the features 152 are not present).

Figure 9A:
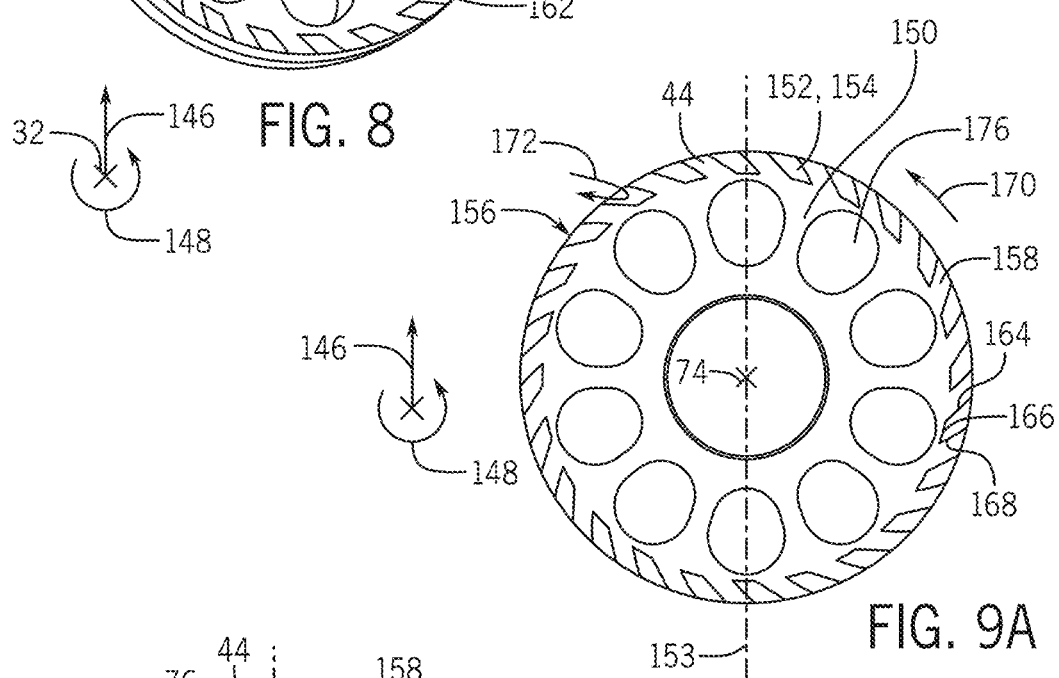
FIGS. 9A and 9B are side perspective views of embodiments of the opposite end faces of a rotor of a rotary PX having hydrodynamic pressure generation features (e.g., spiral grooves)
Figure 9B:
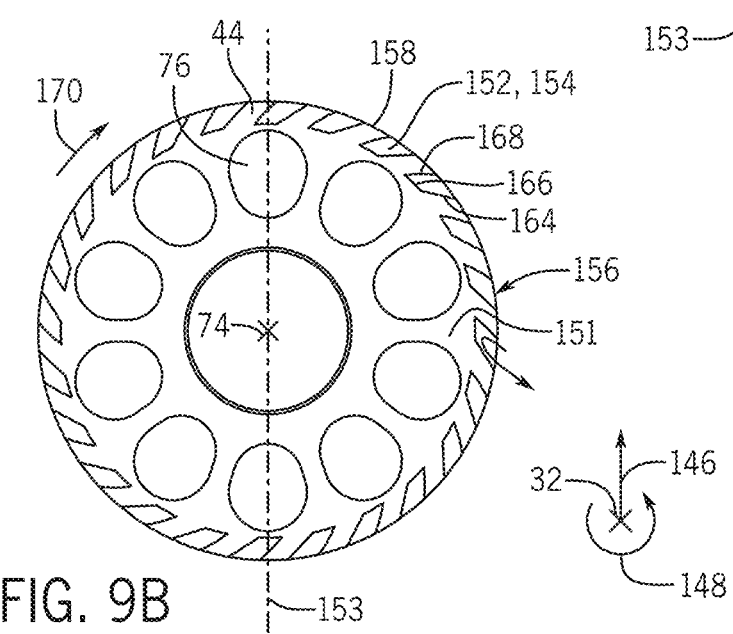

FIGS. 9A and 9B are side perspective views of embodiments of the opposite end faces 150, 151 of the rotor 44 of the rotary PX 20 having hydrodynamic pressure generation features 152 (e.g., spiral grooves). FIG. 9A is similar to FIG. 8 except the rotor end face 150 only includes the single set 156 of grooves 154 on the outer periphery 158. In certain embodiments, both end faces 150, 151 may include grooves along the inner diameter similar to FIG. 8. FIG. 9B is the opposite end face 151 of the rotor 44. As depicted, the grooves 154 on the end face 151 are mirror imaged with respect to the grooves 154 on the end face 150 about a plane 153 that cuts the rotor 44 axially in half. The grooves 154 of the end faces 150, 151 are mirror images because the direction of rotation 170 relative to the end faces 150, 151 is opposite. This ensures the inward and outward pumping works correctly.

Figure 10:
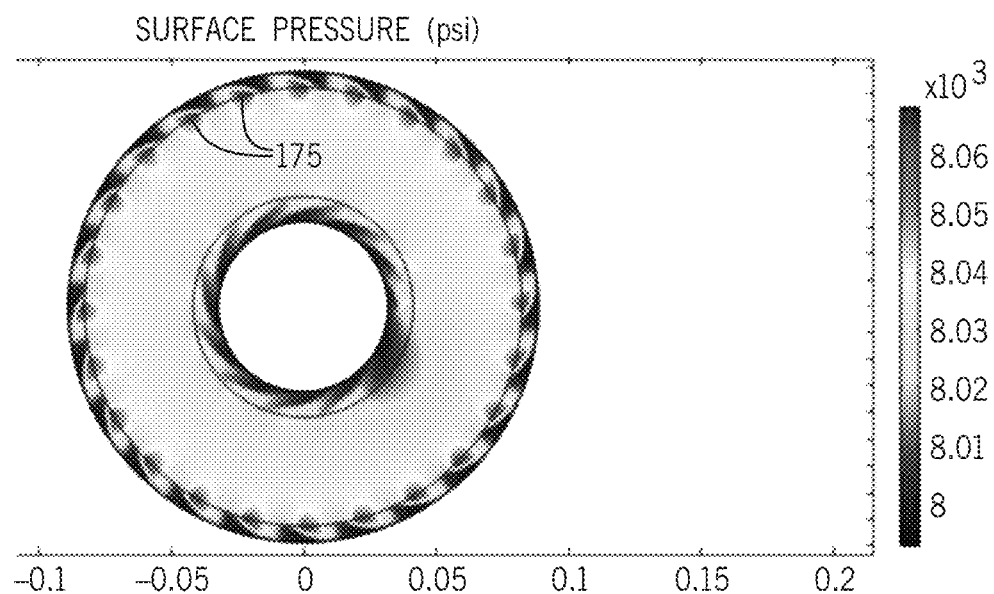
FIG. 10 is a two dimensional plot of the hydrodynamic pressure distribution at the interface between rotor end face of FIG. 8 and a corresponding end cover.
Figure 11:
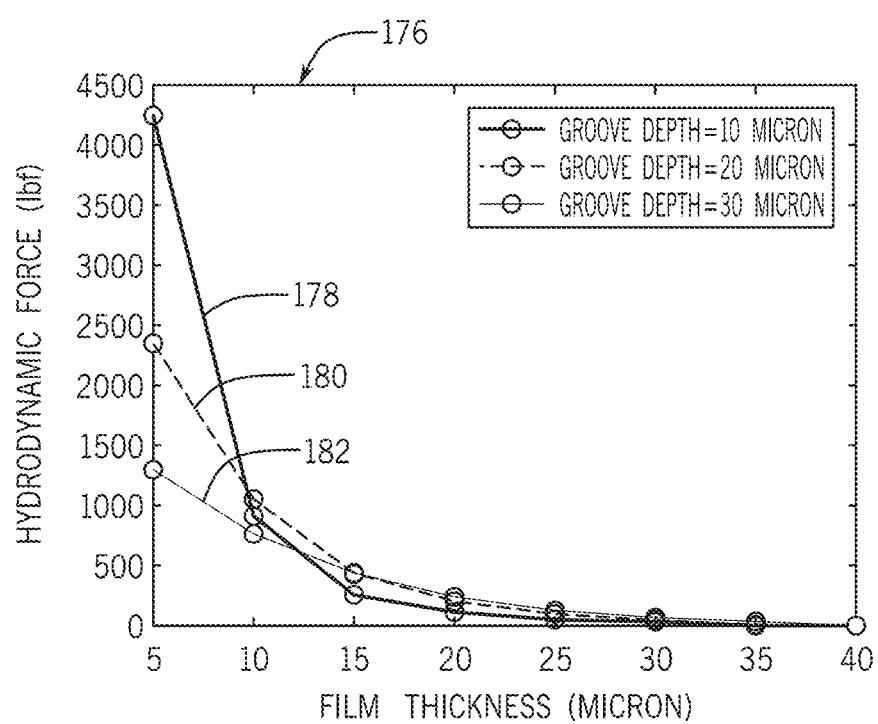
FIG. 11 is a graph of fluid film thickness (e.g., between a rotor end face and end cover) versus hydrodynamic force for different groove depths for spiral grooves on the rotor end face.

FIG. 10 is a representative plot of hydrodynamic pressure distribution (e.g., in the micron scale) of the bearing fluid film between the end face 150 of FIG. 8 and a corresponding end cover 30. For example, high pressure spikes (e.g., indication by regions 175) are visible at the dam portions 168 of the first set 156 of grooves 154 due to kinetic energy being converted to pressure. FIG. 11 is a graph 176 of hydrodynamic force generated versus fluid film thickness (e.g., between the rotor end face 150 and end cover 30) for different grooves depths of spiral grooves 154 on the rotor end face 150. Plots 178, 180, 182 represent groove depths of 10 μm, 20 μm, and 30 μm, respectively, for the spiral grooves 154. Graph 176 indicates that high bearing stiffness (change in hydrodynamic force generated per unit change in film thickness) may be obtained with the spiral grooves 154. In particular, hydrodynamic forces increase with reducing the gap between the rotor 44 and the end cover 30 creating a strong resisting force to push the rotor 44 away from the end cover 30.

Figure 12:
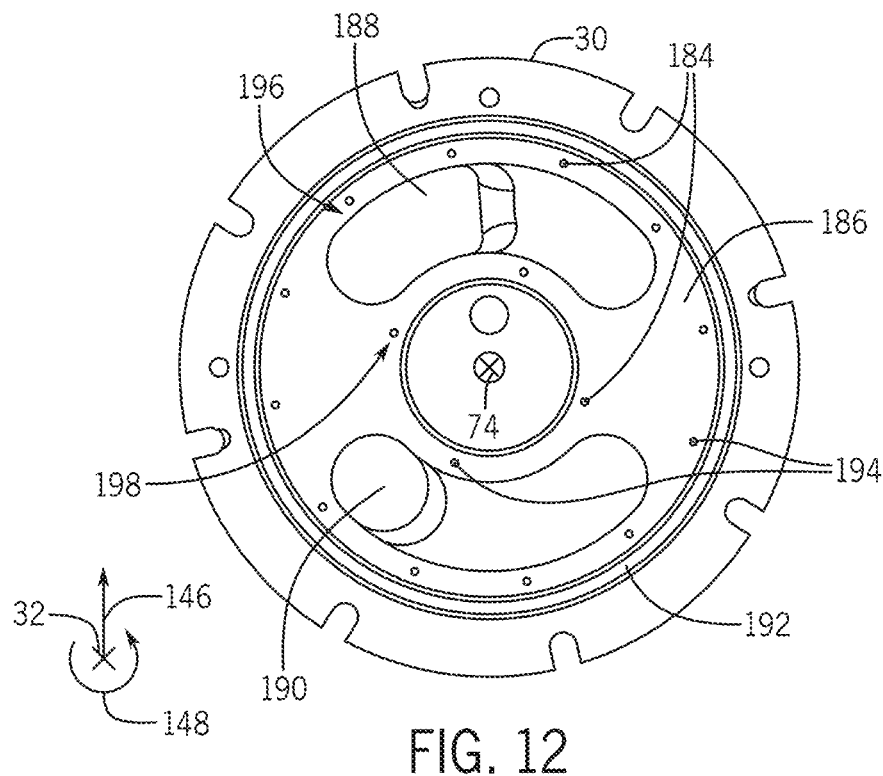
FIG. 12 is a side view of an embodiment of an end cover of a rotary PX having hydrostatic pressure enhancing features (e.g., ports)
Figure 13A:
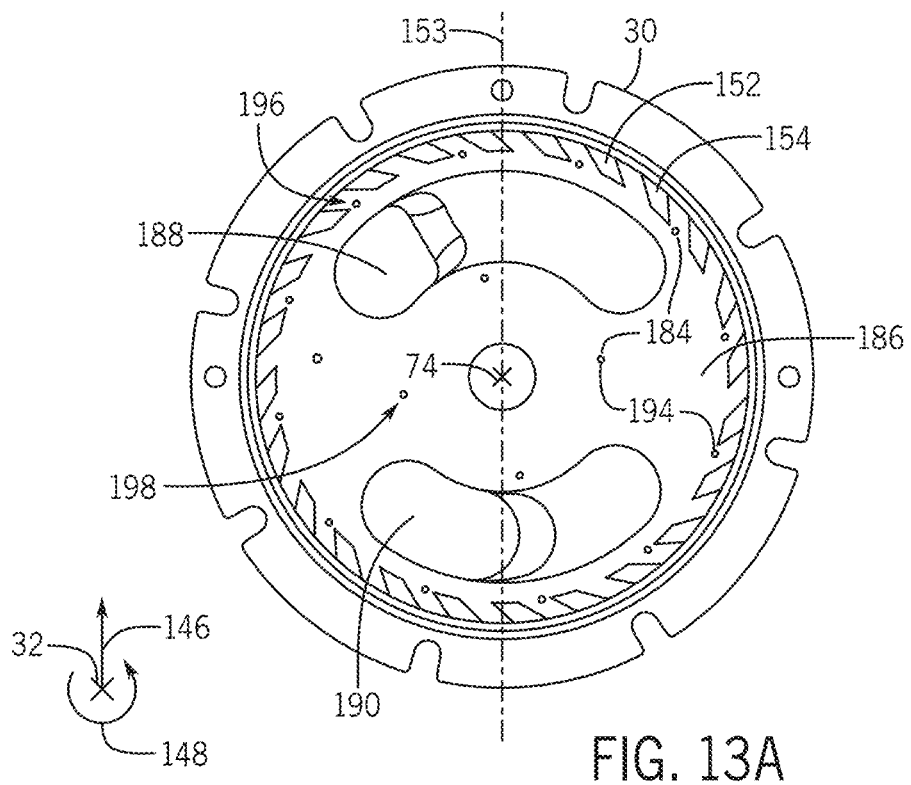
FIGS. 13A and 13B are side views of an embodiment of opposite end covers of a rotary PX having hydrostatic pressure enhancing features (e.g. ports) and hydrodynamic pressure generation features (e.g., spiral grooves)
Figure 13B:
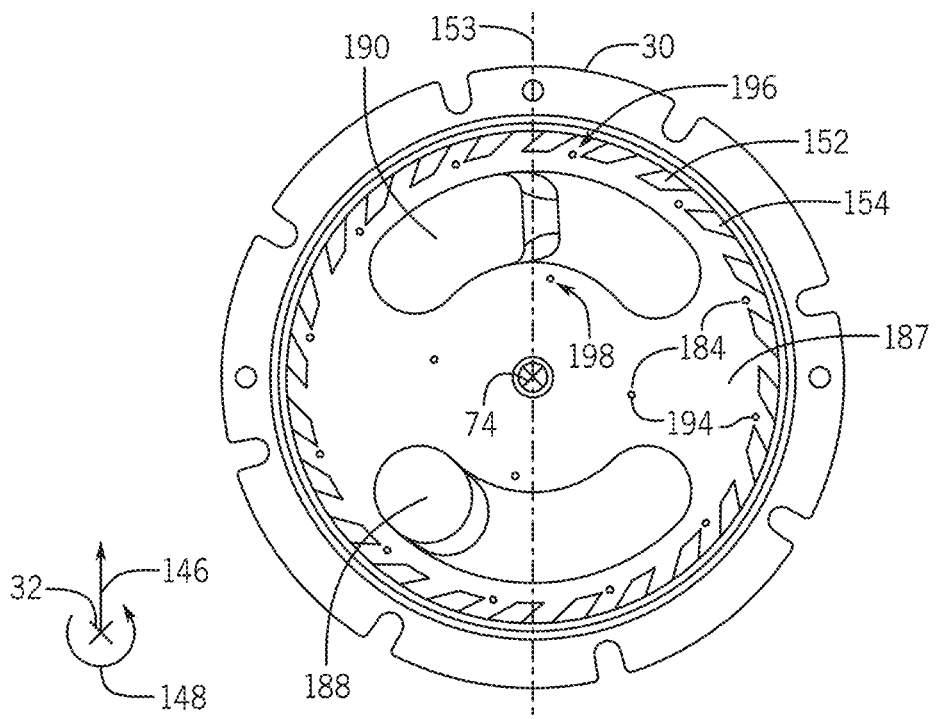
Figure 14:
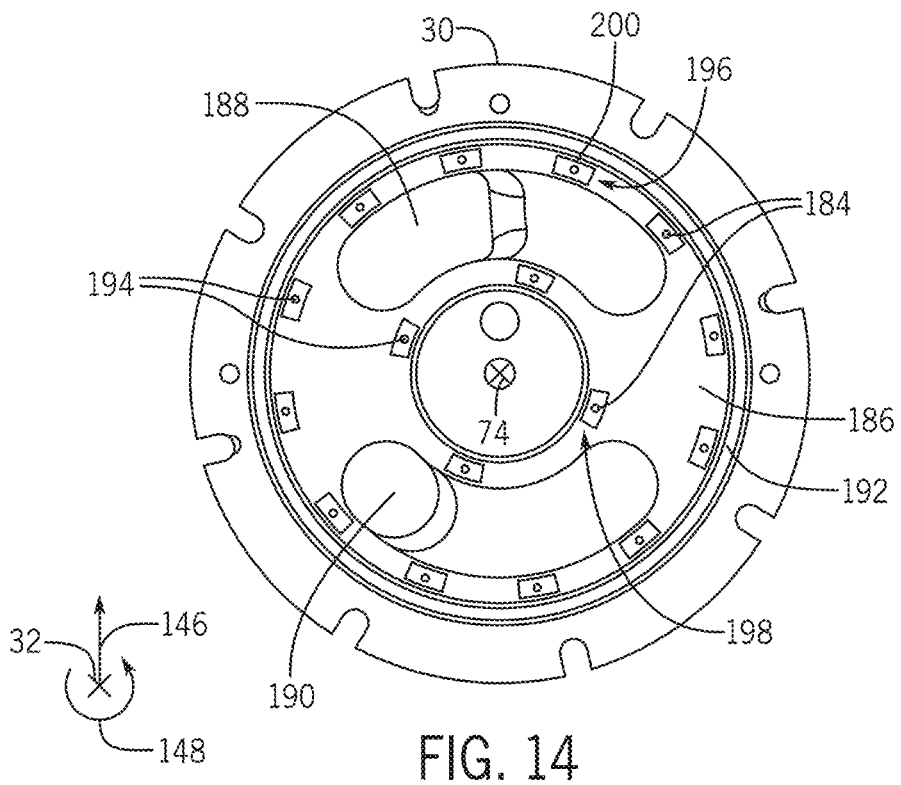
FIG. 14 is a side view of an embodiment of an end cover of a rotary PX having hydrostatic pressure enhancing features (e.g., ports and pockets)

In conjunction with the hydrodynamic features 152 on the rotor end face 150, hydrostatic pressure enhancing features may be present on the end cover 30 surface that interfaces with the rotor end face 150. FIGS. 12-14 are side views of embodiments of the end cover 30 of the rotary PX 20 having hydrostatic pressure enhancing features 184. As depicted in FIGS. 12-14, the features 184 are disposed on a surface 186 (surface 187) of the end cover 30 that interfaces with the rotor end face 150 (or rotor end face 151). The end cover 30 includes apertures 188, 190 and, in certain embodiments, an annular groove 192 (see FIGS. 12 and 14). The annular groove receives the fluid (e.g., HP first fluid) to form a plenum that tries to equalize the circumferential pressure distribution around the rotor 44. As depicted in FIGS. 12-14, the features 184 include ports or openings 194. The number of ports 194 and the shape of the ports 194 may vary. Specifically, a first set 196 of ports 194 is disposed adjacent the groove 192, where the ports 194 are radially 146 inward of the groove 192 and radially outward of the apertures 188, 190 (e.g., relative to axis 74). A second set 198 of ports 194 is disposed radially 146 inward of both the groove 192 and the apertures 188, 190.

Figure 15:
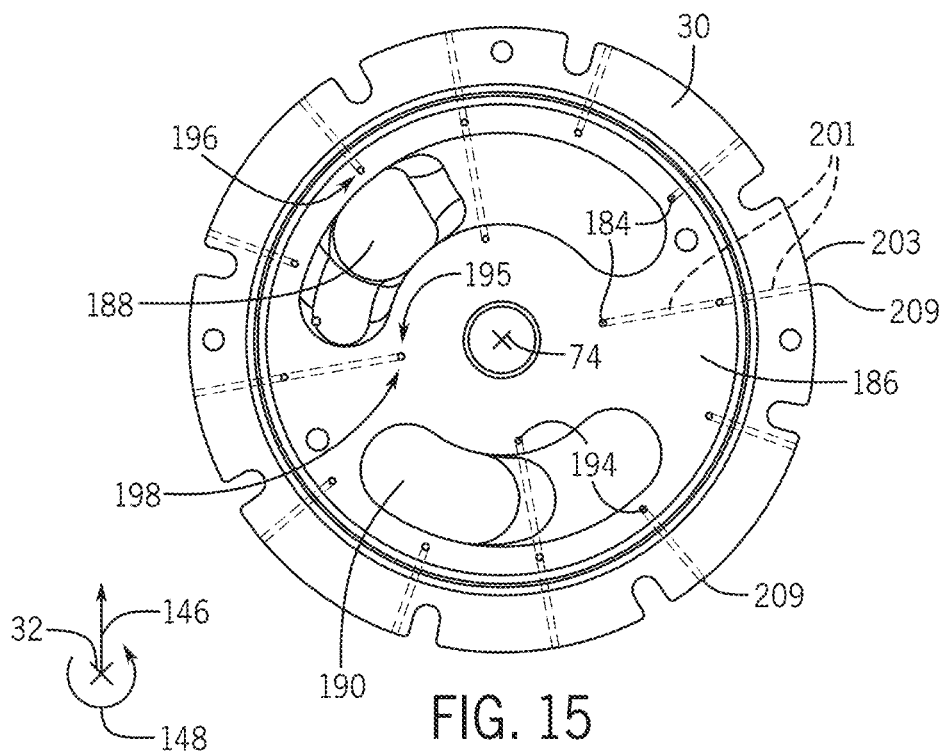
FIG. 15 is a side view of an embodiment of an end cover of a rotary PX (e.g., illustrating a hydrostatic channel network)
Figure 16:
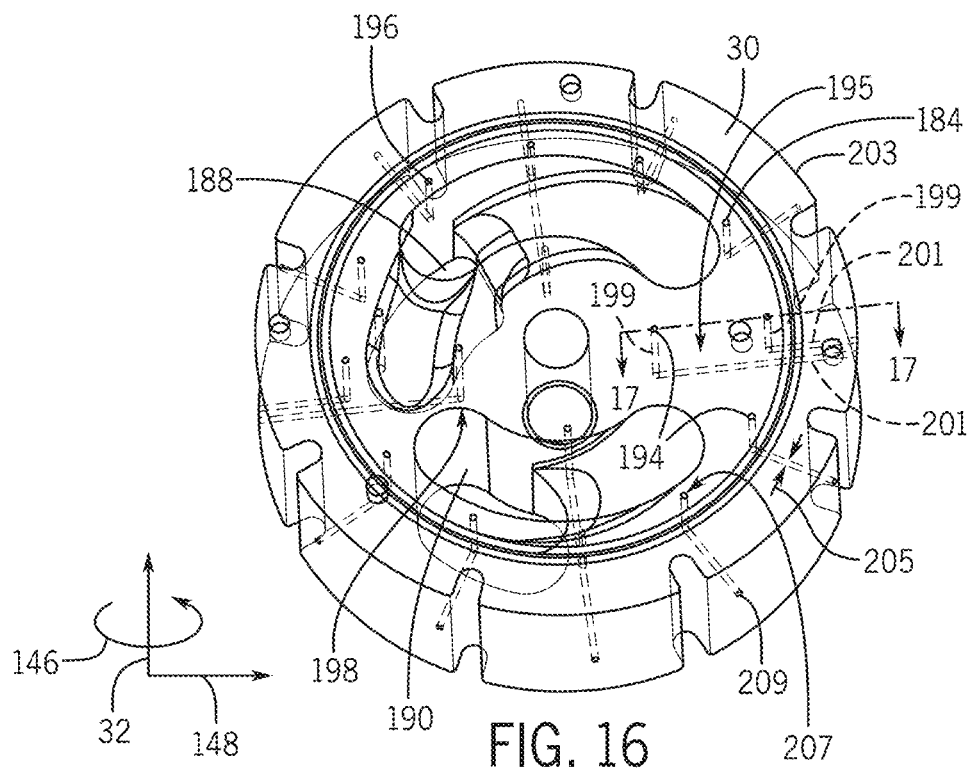
FIG. 16 is a perspective transparent view of an embodiment of an end cover of rotary PX (e.g., illustrating a hydrostatic channel network)

The first and second sets 196,198 of ports 194 form a hydrostatic channel network 195 as depicted in FIGS. 15 and 16. Each port 194 of both sets 196, 198 is coupled to a respective channel 197 (e.g., L-shaped channel) that extends through the end cover 30. In particular, the channel 197 includes a first portion 199 that extends axially 32 into the end cover 30 from the surface 186 and a second portion 201 coupled to the first portion 199 that extends radially 146 to an outer periphery or diameter 203 of the end cover 30. High pressure fluid flows from the outer periphery 203 into the second portion 201 (e.g., via an inlet 209) of the channel 197 through the first portion 199 and radially 146 exits the port 194 (e.g., outlet) to generate a pressure rise in the axial bearing film. In certain embodiments (e.g., as depicted in FIG. 15), an outer diameter port 194 of the first set 196 may share a portion (e.g., second portion 201) of the same channel 197 of a radially adjacent inner diameter port 194 of the second set 198. In certain embodiments (e.g., as depicted in FIG. 16), each port 194 of both sets 196, 198 may be coupled to separate channels 197. During manufacture of the channels 197 in the end covers 30, the second portion 201 has a diameter 205 greater than a diameter 207 of the first portion 199. Pressure drop across a respective channel 197 is dictated by the respective diameters 205, 207 and lengths of the portions 201, 199 and, thus, is optimized such that pressure at the port exit is sufficiently high to create effective hydrostatic bearing action. This ensures that the portions 199, 201 meet with each other to form the channel 197. In certain embodiments, the channels 197 may be machined (e.g. electrical discharge machined).

Returning to FIGS. 12, 13A, and 13B, the first and second sets 196, 198 of ports 194 are radially 146 aligned (e.g., relative to axis 74) with the first and second sets 156, 160 of grooves 154 of the rotor end face 150 in FIG. 8. In certain embodiments, the ports 194 and grooves 154 act together as a hybrid hydrodynamic-hydrostatic bearing system. The hydrodynamic force generated by the grooves 154 supplements the hydrostatic force generated by the ports 194. It is important to note that the hydrostatic features (e.g. 184) provide the additional load bearing capacity on account of the high pressure fluid that is fed through these ports 194 while the hydrodynamic features provide the added load bearing capacity on account of the rotation of the rotor 44 and conversion of kinetics energy to a pressure rise. The hydrodynamic features also provide higher fluid film stiffness than what can be achieved by the hydrostatic bearing alone and hence provide higher resistance to possible rub events triggered by high speed transient motions of the rotor 44 due to various modes of vibrations.

In certain embodiments, the end covers 30 may include both hydrodynamic and hydrostatic features. FIGS. 13A and 13B are side views of an embodiment of opposite end covers 30 of the rotary PX 20 having hydrostatic pressure enhancing features 184 (e.g. ports) and hydrodynamic pressure generation features 152 (e.g., spiral grooves 154) The surfaces 186, 187 of the end covers 30, respectively, interface with the opposite end faces 150, 151 of the rotor 44. The end covers 30 include spiral grooves 154 adjacent the first set 196 of ports 194. As depicted, the first set 196 of ports 194 are circumferentially 148 dispersed between every few grooves 154 (i.e., with a port disposed between every few grooves 154). In certain embodiments, a port 194 may be disposed between each adjacent pair of grooves 154. The grooves 154 on the end cover surface 186 are mirror imaged with respect to the grooves 154 on the end cover surface 187 about the plane 153 for the same reasons noted above for the end rotor end faces 150, 151. The grooves 154 of the end covers 30 function similarly to those on the end faces 150, 151 of the rotor 44.

Figure 17:
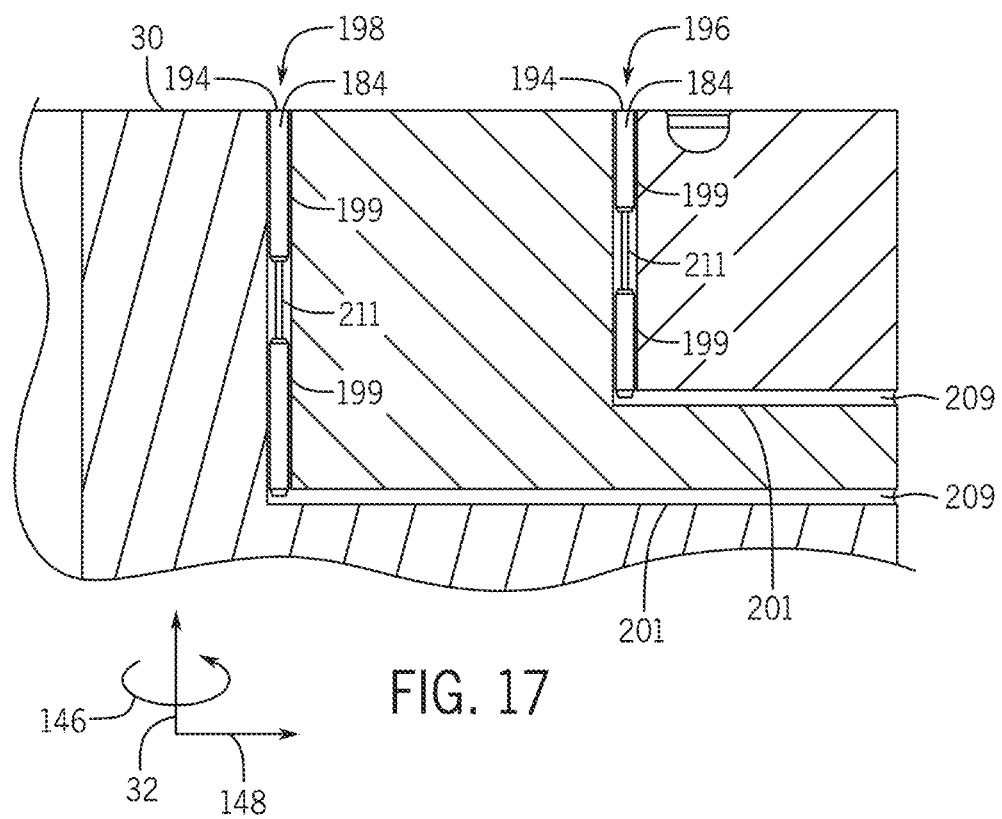
FIG. 17 is a partial cross-sectional view of an embodiment of an end cover of a rotary PX (e.g., having orifice restrictors disposed within channels of the hydrostatic channel network), taken within line 17-17 of FIG. 16.

In certain embodiments, the hydrostatic pressure enhancing features 184 may include the ports 194 disposed within pockets or recesses 200 as shown in FIG. 14. The shape and number of pockets 200 may vary. As depicted, the pockets have a rectangular shape. The number of ports 194 per pocket 200 may vary. In addition, the location of the port 194 relative to the pocket 200 may vary. The pockets 200 may include a depth (e.g., in axial direction 32) of approximately 30 to 100 μm. The pockets 200 provide improved pressure distribution and stiffness. The pockets 200 help avoid choking of the flow through the bearing film if complete closure of the gap between the end cover 30 and the rotor 44 occurs. In certain embodiments, the ports 194 (e.g., in FIGS. 12-14) may include orifice flow restrictors 211 disposed within the channels associated 197 with the ports 194. As depicted in FIG. 17, the orifice flow restrictors 211 are disposed within the channels 197 associated ports 194 in both the first and second sets 196, 198. In particular, the orifice flow restrictors 211 are disposed in the first portion 199. In certain embodiments, the orifice flow restrictors 211 may be disposed in the second portion 201. The orifice flow restrictor 211 provides the ability for the pocket pressure to modulate itself with an applied load. For example, when a very high load is applied to the rotor 44 that forces the rotor 44 to close the bearing gap, the flow out of the bearing film almost goes to zero and there is no flow across the orifice. This causes a pressure drop across the orifice to be negligible enabling the pressure within the hydrostatic pocket to rise. The rise in pocket pressure pushes the rotor 44 away from the end cover 30 to provide a self-correcting behavior. When the axial thrust on the rotor 44 drops to a negligible value, the bearing gap increases enabling large leakage flow through the bearing gap and the only resistance to the flow is provided by the orifice flow restrictor 211. This causes the flow rate to increase until the pressure drop across the orifice is sufficient to reduce pocket pressure. This also brings the rotor 44 back to its equilibrium position via self-correcting behavior. The orifice flow restrictors 211 and pockets 200 may be machined (e.g. electrical discharge machined) on the end cover 30. In certain embodiments, external orifice flow restrictors can also be mounted at the openings of the hydrostatic ports located on the OD of the end cover 30.

Returning to FIG. 14, the hydrostatic features 184 (e.g., ports 194, pockets 200, orifice flow restrictors, etc.) generate a pressure rise in the axial bearing film when high pressure fluid is pumped through the ports 194 and/or orifice flow restrictors. In operation, the ports 194 utilize the pressure of the HP fluid (e.g., first fluid or second fluid depending on the end cover 30) to apply a force against the rotor 44 to eliminate and/or substantially reduce the likelihood that the rotor 44 contacts the end cover 30. In particular, For example, as the rotor 44 is driven toward the end cover 30 via a first external (and unintended) force, the localized pressure in the axial bearings (i.e., hydrostatic features 184) increases, thereby generating a second internal (and intended) force on the rotor 44 that is equal to or slightly greater than the first force. As a result, the force produced by the axial bearings maintains the rotor 44 in a balanced position.

Figure 18:
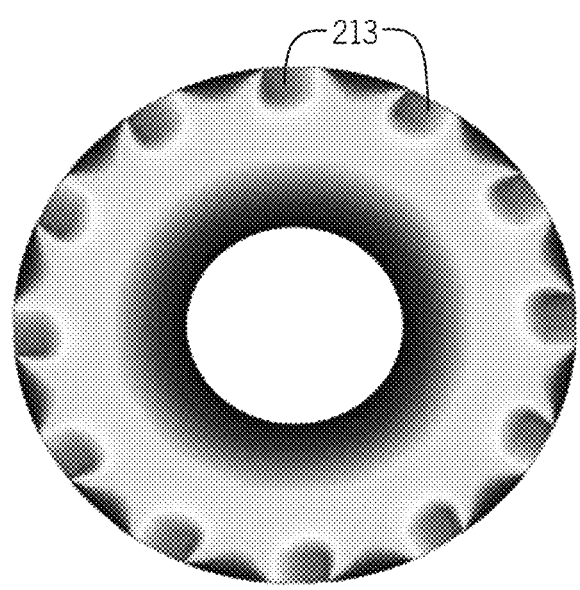
FIG. 18 is a two dimensional plot of hydrostatic pressure distributions at the interface between a rotor and the end cover of FIG. 11.
Figure 19:
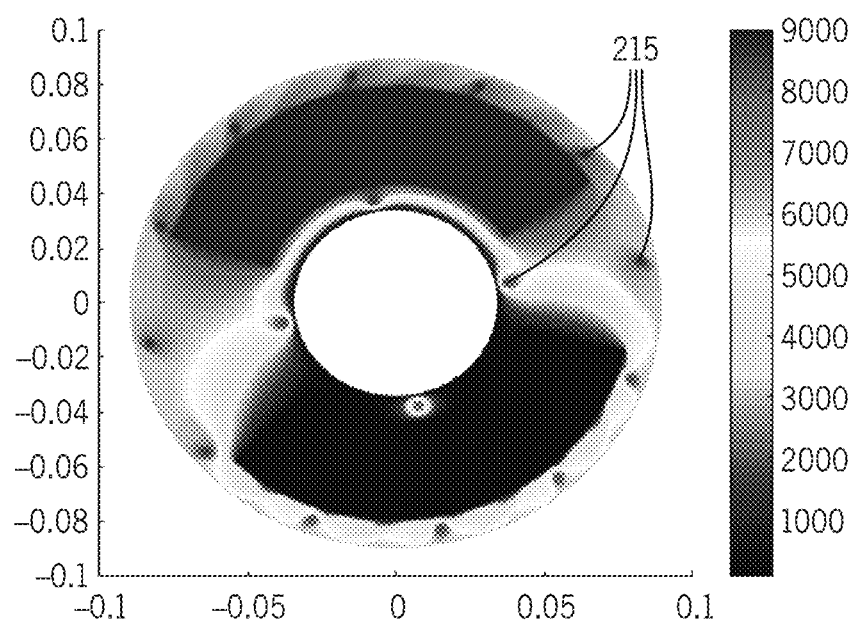
FIG. 19 is a two dimensional plot of hydrostatic pressure distributions at the interface between a rotor and an end cover having a hybrid bearing system.
Figure 20:
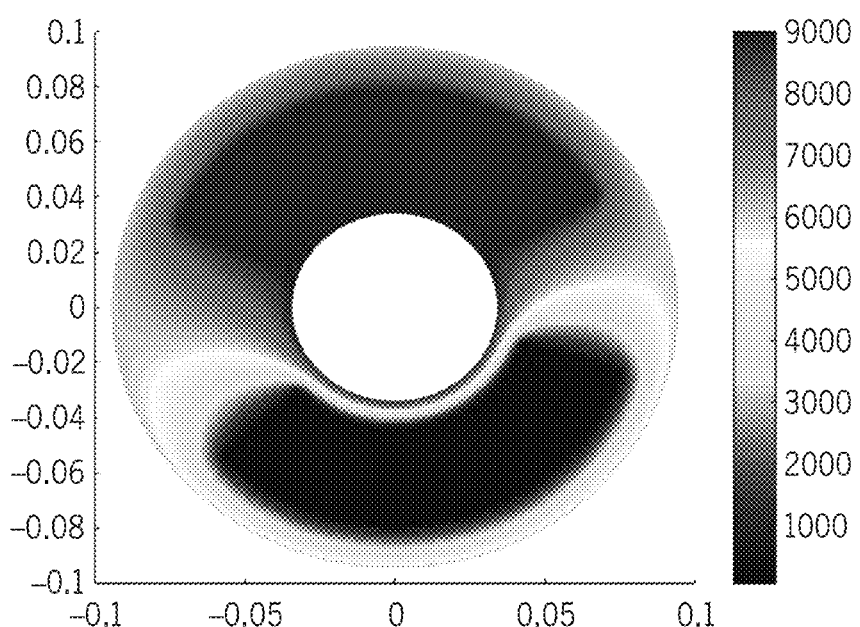
FIG. 20 is a two dimensional plot of hydrostatic pressure distributions at the interface between a rotor and an end cover lacking a hybrid bearing system.

FIG. 18 is a two dimensional plot of the hydrostatic pressure distributions at the interface between a rotor and the end cover 30 of FIG. 12. As depicted, high pressure regions 213 are present in the film regions corresponding to the first set 196 of ports 194. FIG. 19 is a two dimensional plot of hydrostatic pressure distributions at the interface between a rotor and an end cover (e.g., end cover 30 in FIG. 13A) having a hybrid bearing system. As depicted in FIG. 19, high pressure regions 215 are present in the film regions corresponding to both the first set 196 of ports 194 and the second set 198 of ports 194 and the spiral grooves 154. FIG. 20 is a two dimensional plot of hydrostatic pressure distributions at the interface between a rotor and an end cover lacking a hybrid bearing system. As depicted in FIG. 20, there is an absence of the high pressure regions observed in FIG. 19. These high pressure regions 215 in FIG. 19 provide additional load bearing capacity compared to an end cover 30 without a hybrid bearing.

Figure 21:
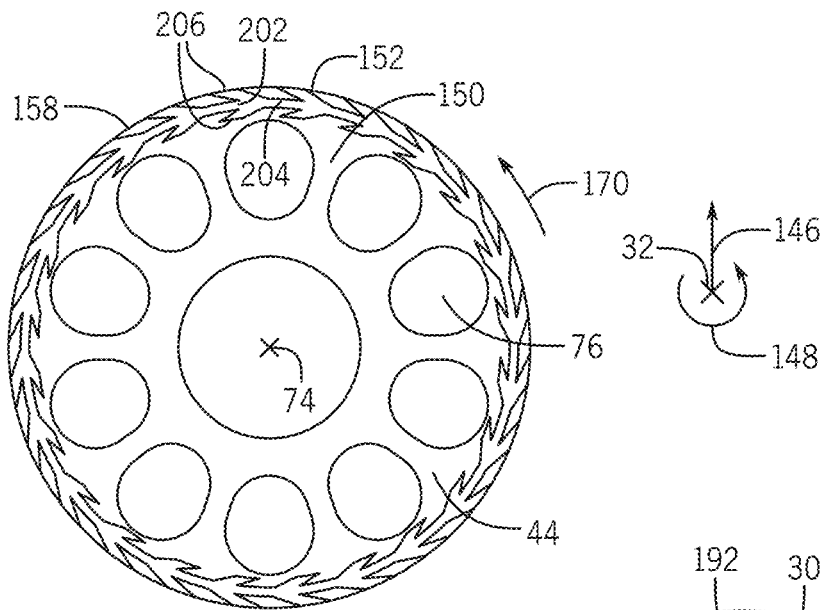
FIG. 21 is a side view of an embodiment of an end face of a rotor of a rotary PX having hydrodynamic pressure generation features (e.g., herringbone shaped groove)

FIG. 21 illustrates an alternative groove shape for the hydrodynamic feature 152 on the end face 150 of the rotor 44. The hydrodynamic feature 152 includes herringbone shaped groove 202. The groove 202 is disposed circumferentially 148 about the longitudinal axis 74 along an outer periphery or diameter 158 of the end face 150 (e.g., radially outside of the channels 76). The groove 202 includes a central circumferential portion 204 and branches 206 extending at an angle (e.g., oblique angle) away from the portion 204 to form Y-shaped portions for the groove 202. The herringbone shape grove 202 provides a bi-directional tilt/deflection correcting capacity due to the Y-shaped branches of the groove 202. Thus, if rotor 44 tilts or deforms towards an inner diameter, the radially 146 inward branches 206 ride at a smaller film thickness. This causes the inner branches 206 to produce more hydrodynamic pressure than the radially 146 outward branches 206 resulting in pushing the rotor 44 back to its equilibrium position. If the rotor 44 tilts or deforms towards the outer diameter, the radially 146 outward branches ride at a smaller thickness. This causes the outer branches 206 to produce more hydrodynamic pressure than inner branches 206 resulting in pushing the rotor 44 backs to its equilibrium position. The branches of the Y-shaped portion help accelerate the flow towards dam portions located at the ends of each of the branches 206. The central portion 204 of the groove 202 helps circulate the flow uniformly across all of the Y-shaped portions and avoids choking any one channel that may create moment imbalance on the rotor 44. The central portion 204 also takes away heat generated in the Y-shaped branches. In particular, the central portion 204 provides cooling flow to dissipate high viscous heat arising from hydrodynamic action to avoid waring of faces and heat checking. The groove 202 may be machined (e.g. electrical discharge machined) on the end face 150.

In certain embodiments, the groove 202 on the end face 150 may be utilized in conjunction with hydrostatic features 184 on the end cover 30. For example, the groove 202 may be utilized in conjunction with the hydrostatic features 184 (e.g., ports, pockets, etc.) on the end cover 30 in FIGS. 12-14. In certain embodiments, the ports 194 on the end cover 30 may radially 146 aligned with the central portion 204.

Figure 22:
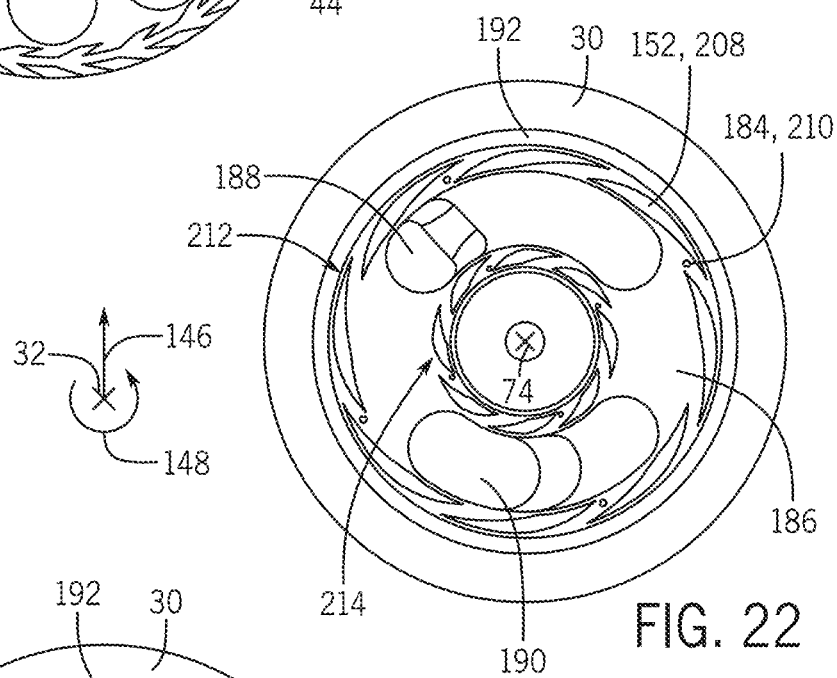
FIG. 22 is a side view of an embodiment of an end cover of a rotary PX having both hydrodynamic and hydrostatic pressure enhancing features (e.g., spiral grooves and ports between the grooves)
Figure 23:
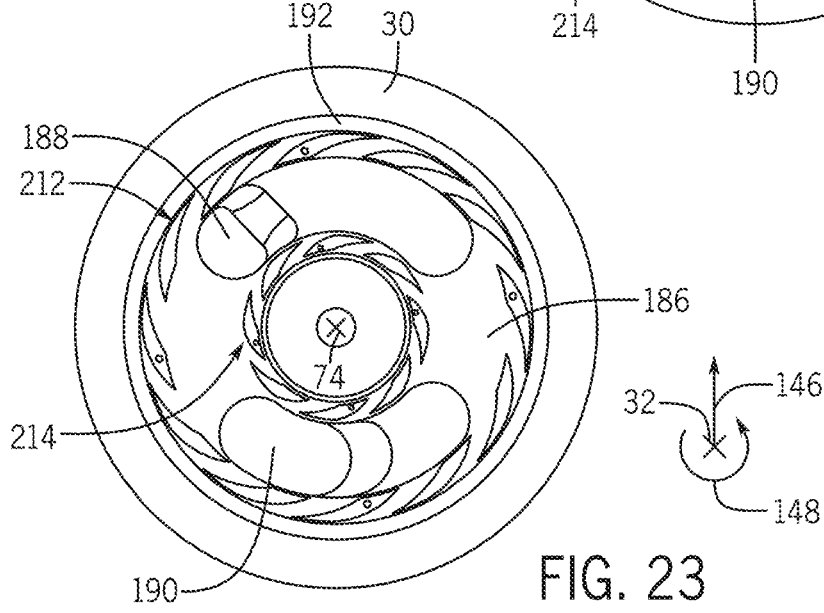
FIG. 23 is a side view of an embodiment of an end cover of a rotary PX having both hydrodynamic and hydrostatic pressure enhancing features (e.g., spiral grooves and ports disposed within the grooves)

In certain embodiments, both the hydrodynamic and hydrostatic features 152, 184 (e.g., grooves and the ports) may be disposed solely on the surface 186 of the end cover 30 with no features 152, 184 disposed on the interfacing rotor end face 150. FIGS. 22 and 23 are side views of an embodiment of the end cover 30 of the rotary PX 20 having both hydrodynamic 152 and hydrostatic pressure enhancing features 184 (e.g., spiral grooves 208 and ports 210 between the grooves 208). A first set 212 of grooves 208 (e.g., inward pumping grooves) are disposed circumferentially 148 relative to the longitudinal axis 74 on the surface 186 (e.g., radially 146 between the channels 76 and the groove 192). A second set 214 of grooves 208 (e.g., outward pumping grooves) are disposed circumferentially 148 relative to the longitudinal axis 74 on the surface 186 (e.g., radially 146 inward of both the channels 76 and the groove 192). The number of grooves 208 and shape of the grooves 208 may vary. Functionally the grooves 208 operate similar to the grooves 154 in FIG. 8. As depicted in FIG. 22, ports 210 are circumferentially disposed on the surface 180 between the grooves 208 (e.g., in circumferential alignment with the grooves 208). As depicted in FIG. 22, the ports 210 are disposed between every few grooves 208. In certain embodiments, the ports 210 may be disposed between each pair of adjacent grooves 208. As depicted in FIG. 23, ports 210 are circumferentially disposed on the surface 180 on the grooves 208. As depicted in FIG. 23, the ports 210 are disposed on some of the grooves 208. In certain embodiments, the ports 210 may be disposed on each of the grooves 208. The ports 210 operate functionally similar to the ports 194 described above. Together the grooves 208 and the ports 210 function as a hybrid hydrodynamic-hydrostatic bearing system.

Figure 24:
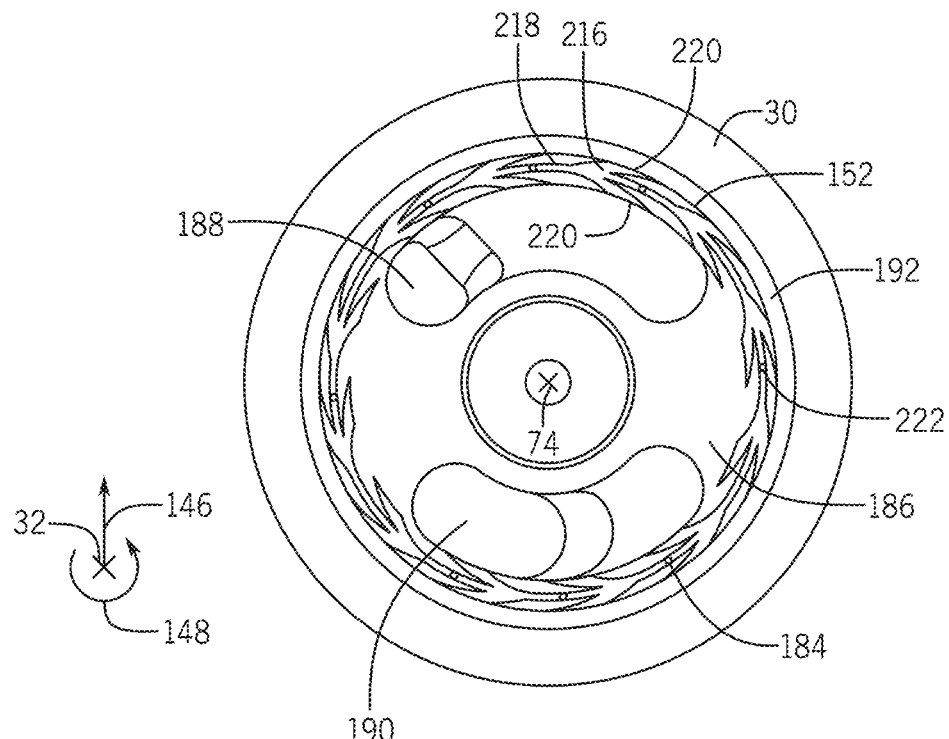
FIG. 24 is a side view of an embodiment of an end cover of a rotary PX having both hydrodynamic and hydrostatic pressure enhancing features (e.g., herringbone-shaped groove and ports)

FIG. 24 is a side view of an embodiment of the end cover 30 of the rotary PX 20 having both hydrodynamic 152 and hydrostatic pressure enhancing features 184 (e.g., herringbone-shaped groove and ports). As depicted, the hydrodynamic feature 152 includes a herringbone-shaped groove 216 radially disposed on the surface 186 of the end cover 30 between the groove 192 and the apertures 188, 190. Structurally, the groove 216 includes a central portion 218 and branches 220 similar to groove 202 in FIG. 21. In addition, the groove 216 functions similarly to groove 202 in FIG. 21. As depicted, the hydrostatic pressure enhancing features 184 include ports 222 disposed on the groove 216. In particular, the ports 222 are disposed on the central portion 218 between the Y-shaped portions. As depicted, the ports 222 are disposed between some of the adjacent Y-shaped portions of the groove 216. In certain embodiments, the ports 222 may be disposed between each adjacent pair of Y-shaped portions of the groove 216. The number and shape of the ports 222 may vary. The ports 222 function similarly to the ports 194 in FIGS. 12-14. Together, the ports 222 and the groove 216 act together to function as the hybrid hydrodynamic-hydrostatic bearing system.

Figure 25:
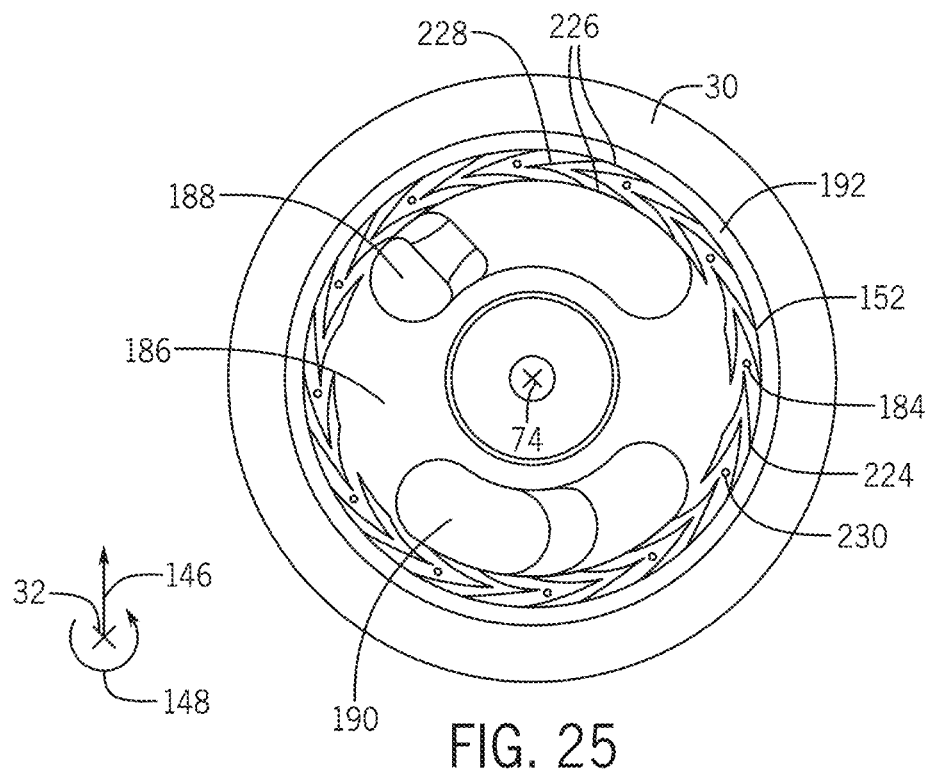
FIG. 25 is a side view of an embodiment of an end cover of a rotary PX having both hydrodynamic and hydrostatic pressure enhancing features (e.g., V-shaped groove and ports)

FIG. 25 is a side view of an embodiment of the end cover 30 of the rotary PX 20 having both hydrodynamic 152 and hydrostatic pressure enhancing features 184 (e.g., V-shaped groove and ports). As depicted, the hydrodynamic features 152 include plurality of grooves 224 (e.g., V-shaped grooves) radially disposed on the surface 186 of the end cover 30 between the groove 192 and the apertures 188, 190. In addition, the grooves 224 are circumferentially aligned with respect to each other. Each groove 224 includes a couple of branches 226 that converge on a central portion 228. The purpose of the two branches of the "V" shape is similar to that in FIG. 24 i.e. to provide "bi-directional" tilt & ND2 vibration correction. However in this case the central circumferential channel connecting all the individual grooves is not included. The reason being in certain applications where leakage flow through the bearing film needs to be minimized, the absence of such central deeper circumferential channel helps reduce the leakage while still benefitting from bi-directional tilt correction mechanism. As depicted, the hydrostatic pressure enhancing features 184 include ports 230 disposed between each adjacent pair of grooves 224. The ports 230 are circumferentially aligned with the central portions of the grooves 224. The number and shape of the ports 230 may vary. The ports 230 function similarly to the ports 194 in FIGS. 12-14. Together, the ports 230 and the grooves 224 act together to function as the hybrid hydrodynamic-hydrostatic bearing system.

Figure 26:
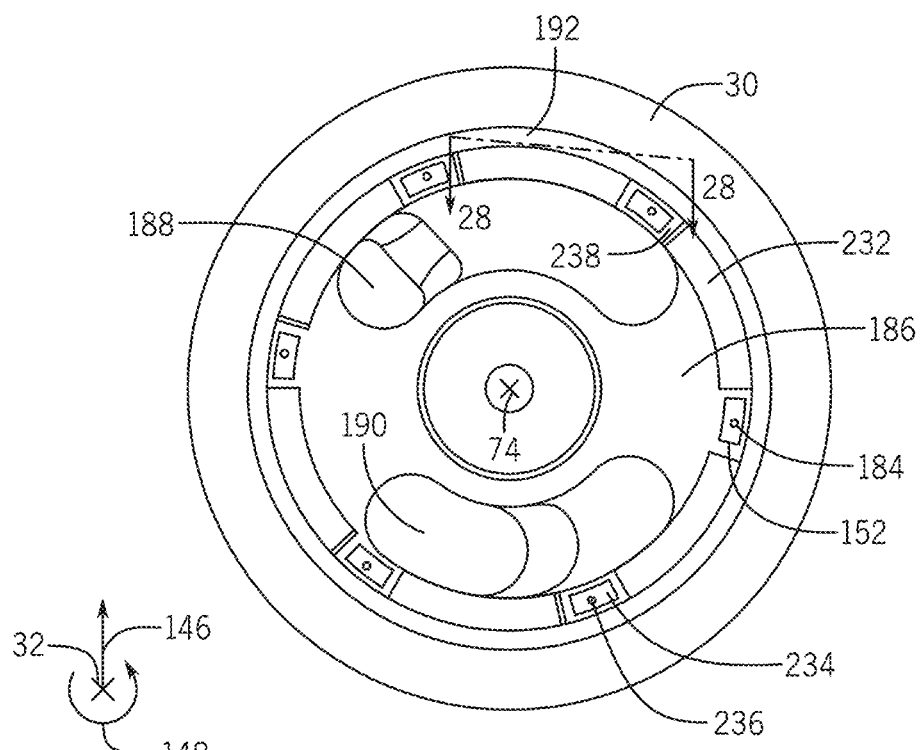
FIG. 26 is a side view of an embodiment of an end cover of a rotary PX having both hydrodynamic and hydrostatic pressure enhancing features (e.g., a tapered land and ports)
Figure 27:
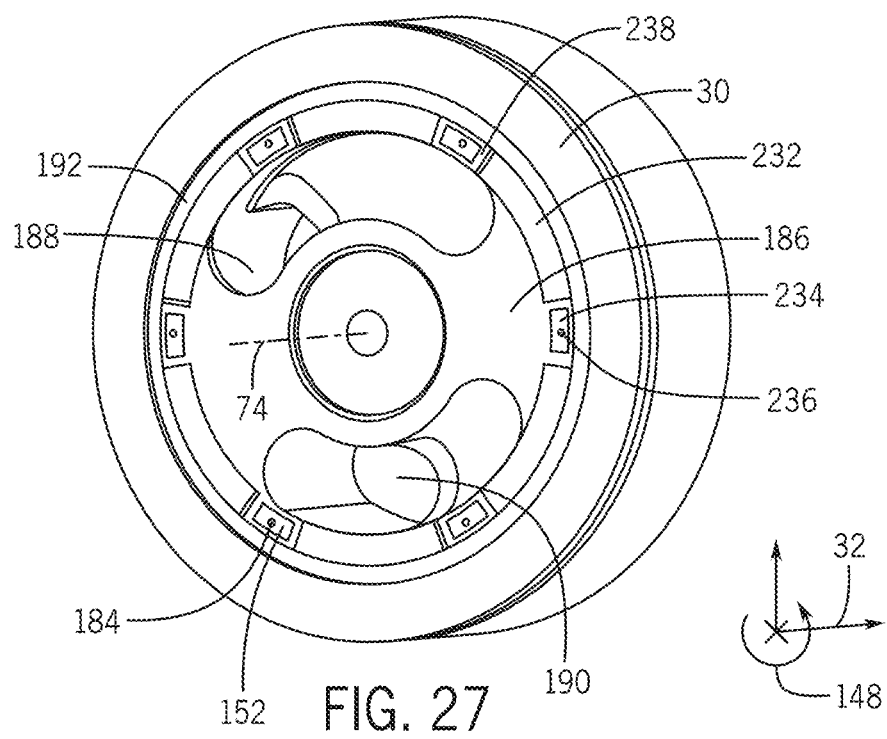
FIG. 27 is a perspective view of the end cover of FIG. 26.

FIGS. 26 and 27 are side and perspective views, respectively, of an embodiment of the end cover 30 of the rotary PX 30 having both hydrodynamic 152 and hydrostatic pressure enhancing features 184 (e.g., a tapered land, ports, pockets). FIG. 28 is a cross-sectional view of the end cover 30 taking along line 28-28 of FIG. 26. The hydrodynamic features 152 include tapered lands 232 radially disposed between the groove 192 and the apertures 188, 190. The hydrostatic features 184 include a pocket 234 and a port 236 disposed within the pocket 234 disposed on a plateau or flat region 238 adjacent each tapered land 232. In certain embodiments, the flat region 238 only includes the port 236 (i.e., without a pocket 234). The pockets 234 and ports 236 function as described in FIG. 14. The depth, shape, and size of the pockets 234 may vary. The shape, number, and location of the ports 236 may vary. Multiple pairs of the tapered land 232 and flat region 238 are circumferentially disposed in alignment about the axis 74 in an annular arrangement. As depicted in FIG. 28, the tapered land 232 rises (e.g., in direction 32) along the circumferential direction 148 from circumferential position $\theta_0$ to $\theta_1$ adjacent the flat region 238. As depicted, the length of the tapered land 232 is greater than length of the flat region 238. Motion of a flat surface (e.g., end surface 150 of the rotor 44) over the tapered land 232 draws fluid into the converging wedge-shaped zone 240 using what is called a "squeeze action" which generates pressure in wedge that is higher than fluid surrounding the wedge. The pressure inside the fluid film remains constant at this raised value as the rotor 44 pushes the fluid over the flat region 238. The port 236 generates hydrostatic pressure to supplement the pressure in the flat region 238, as well as to provide source of fluid in the flat region in the event that the gap in the flat region gets completely closed that no new fluid could enter the film. Thus, the ports 236 (and/or pockets 234) and the tapered lands 232 act together to function as the hybrid hydrodynamic-hydrostatic bearing system. The performance of the hybrid tapered land—hydrostatic bearing may be optimized via adjustment of the angle of the tapered land 232, maximum and minimum depth of the tapered area, location of the hydrostatic ports 236, and the size of the hydrostatic pockets 234.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a hydraulic energy transfer system configured to exchange pressures between a first fluid and a second fluid, wherein the first fluid has a pressure higher than the second fluid, comprising:
a cylindrical rotor configured to rotate circumferentially about a rotational axis and has a first end face and a second end face disposed opposite each other;
a first end cover having a first surface that interfaces with the first end face of the cylindrical rotor; and
a hybrid hydrodynamic-hydrostatic bearing system configured to resist axial displacement of the cylindrical rotor, wherein the hybrid hydrodynamic-hydrostatic bearing system comprises both hydrostatic pressure enhancement features and hydrodynamic pressure generation features disposed on the first surface of the first end cover, wherein the hydrostatic pressure enhancement features disposed on the first surface of the first end cover comprise a first plurality of ports circumferentially spaced apart relative to a longitudinal axis of the cylindrical rotor, and wherein the hydrodynamic pressure generation features disposed on the first surface of the first end cover comprise a plurality of grooves circumferentially spaced apart relative to the longitudinal axis, the first plurality of ports being circumferentially aligned with the plurality of grooves relative to the longitudinal axis, and each port of the first plurality of ports is disposed between an adjacent pair of grooves of the plurality of grooves wherein the first end cover further comprises an inlet duct and an outlet duct which are radially spaced from the hybrid hydrodynamic-hydrostatic bearing system.

2. The system of claim 1, wherein the hydraulic energy transfer system comprises a rotary pressure exchanger.

3. The system of claim 1, wherein the hydrostatic pressure enhancement features disposed on the first surface of the first end cover comprise a second plurality of ports circumferentially spaced apart relative to the longitudinal axis, wherein the second plurality of ports are located radially inward of the first plurality ports relative to the longitudinal axis.

4. The system of claim 3, wherein the first and second plurality of ports are coupled to a plurality of channels disposed within the first end cover to form a hydrostatic channel network.

5. The system of claim 4, wherein each channel of the plurality of channels comprises a first portion that extends axially relative to the longitudinal axis and a second portion that extends radially relative to the longitudinal axis, and wherein the second portion is coupled to an inlet configured to receive a high pressure fluid, and the first portion is coupled to a respective port of either the first plurality or second plurality of ports configured to discharge the high pressure fluid.

6. The system of claim 5, wherein a diameter of the second portion is greater than a diameter of the first portion.

7. The system of claim 4, wherein the hydrostatic pressure enhancement features comprise an orifice flow restrictor disposed within at least one channel of the plurality of channels.

8. The system of claim 3, wherein the hydrostatic pressure enhancement features comprise a plurality of recesses disposed on the first surface of the first end cover, and a respective port of either the first plurality or second plurality of ports is disposed within a respective recess of the plurality of recesses.

9. The system of claim 1, wherein the hydrodynamic pressure generation features disposed on the first surface of the first end cover comprise a herringbone shaped groove that extends circumferentially about the longitudinal axis, and first plurality of ports are disposed within the herringbone shaped groove.

10. The system of claim 1, wherein each groove of the plurality of grooves comprises a V-shape or a spiral shape.

11. A system, comprising:
a hydraulic energy transfer system configured to exchange pressures between a first fluid and a second fluid, wherein the first fluid has a pressure higher than the second fluid, comprising:
a cylindrical rotor configured to rotate circumferentially about a rotational axis and has a first end face and a second end face disposed opposite each other;
a first end cover having a first surface that interfaces with the first end face of the cylindrical rotor; and
a hybrid hydrodynamic-hydrostatic bearing system configured to resist axial displacement of the cylindrical rotor, wherein the hybrid hydrodynamic-hydrostatic bearing system comprises hydrodynamic pressure generation features disposed on the first end face of the cylindrical rotor and hydrostatic pressure enhancement features disposed on the first surface of the first end cover, the hydrodynamic pressure generation features comprise one or more grooves disposed on the first end face of the cylindrical rotor, the hydrostatic pressure enhancement features comprise a plurality of ports, wherein the hydrodynamic pressure generation features disposed on the first end face comprise a first plurality of grooves circumferentially spaced apart relative to a longitudinal axis of the cylindrical rotor adjacent an outer diameter of the cylindrical rotor, and wherein the hydrodynamic pressure generation features disposed on the first end face comprise a second plurality of grooves circumferentially spaced apart relative to the longitudinal axis adjacent an inner diameter of the cylindrical rotor wherein the rotor further comprises a plurality of channels which are radially spaced from the second plurality of grooves.

12. The system of claim 11, wherein each groove of the first plurality of grooves has a spiral shape.

13. The system of claim 11, wherein the hydrodynamic pressure generation features disposed on the first end face comprise a herringbone shaped groove that extends circumferentially about a longitudinal axis of the cylindrical rotor adjacent an outer diameter of the cylindrical rotor.

14. The system of claim 11, wherein the hydrostatic pressure enhancement features disposed on the first surface of the first end cover comprise a second plurality of ports circumferentially spaced apart relative to the longitudinal axis, wherein the second plurality of ports are located radially inward of the first plurality ports relative to the longitudinal axis.

15. The system of claim 14, wherein the first and second plurality of ports are coupled to a plurality of channels disposed within the first end cover to form a hydrostatic channel network.

16. The system of claim 15, wherein the hydrostatic pressure enhancement features comprise an orifice flow restrictor disposed within at least one channel of the plurality of channels.

17. The system of claim 11, wherein the hydrostatic pressure enhancement features comprise a plurality of recesses disposed on the first surface of the first end cover, and a respective port of either the first plurality or second plurality of ports is disposed within a respective recess of the plurality of recesses.

18. A system, comprising:
a hydraulic energy transfer system configured to exchange pressures between a first fluid and a second fluid, wherein the first fluid has a pressure higher than the second fluid, comprising:
a cylindrical rotor configured to rotate circumferentially about a rotational axis and has a first end face and a second end face disposed opposite each other;
a first end cover having a first surface that interfaces with the first end face of the cylindrical rotor; and
a hybrid hydrodynamic-hydrostatic bearing system configured to resist axial displacement of the cylindrical rotor, wherein the hybrid hydrodynamic-hydrostatic bearing system comprises both hydrodynamic pressure generation features disposed on the first surface of the first end cover and hydrostatic pressure enhancement features disposed on the first surface of the first end cover wherein the hydrostatic pressure enhancement features disposed on the first surface of the first end cover comprise a first plurality of ports circumferentially spaced apart relative to a longitudinal axis of the cylindrical rotor, and wherein the hydrodynamic pressure generation features disposed on the first surface of the first end cover comprise a plurality of tapered lands circumferentially spaced apart relative to the longitudinal axis, the first plurality of ports being circumferentially aligned with the plurality of grooves relative to the longitudinal axis, and each port of the first plurality of ports is disposed between an adjacent pair of tapered lands of the plurality of tapered lands and wherein each respective tapered land rises toward and is continuous with a respective flat region along a circumferential direction relative to the longitudinal axis, each port being disposed on a respective flat region.

* * * * *